US012780074B2

(12) United States Patent
Marino et al.

(10) Patent No.: US 12,780,074 B2
(45) Date of Patent: Nov. 3, 2026

(54) METHOD AND APPARATUS FOR TRANSLATING DUMPSTERS

(71) Applicant: Phase II Enterprises, Inc., Canton, OH (US)

(72) Inventors: Richard Marino, Canton, OH (US); Steffon L. Hoppel, Louisville, OH (US); Gary Karlen, Minerva, OH (US)

(73) Assignee: Phase II Enterprises, Inc., Canton, OH (US)

( * ) Notice: Subject to any disclaimer, the term of this patent is extended or adjusted under 35 U.S.C. 154(b) by 22 days.

(21) Appl. No.: 18/766,764

(22) Filed: Jul. 9, 2024

(65) Prior Publication Data

US 2024/0359614 A1 Oct. 31, 2024

Related U.S. Application Data

(62) Division of application No. 17/751,055, filed on May 23, 2022, now Pat. No. 12,059,991.

(51) Int. Cl.
*B60P 1/64* (2006.01)

(52) U.S. Cl.
CPC ........... *B60P 1/6463* (2013.01); *B60P 1/6427* (2013.01); *B60P 1/649* (2013.01)

(58) Field of Classification Search
CPC ............................. B60P 1/6427; B60P 1/6463
USPC ................ 414/491, 494, 498, 500, 555, 559
See application file for complete search history.

(56) References Cited

U.S. PATENT DOCUMENTS

| | | | | |
|---|---|---|---|---|
| 3,987,918 | A | 10/1976 | Corompt | |
| 4,968,080 | A | 11/1990 | Kerry | |
| 5,163,800 | A | 11/1992 | Raisio | |
| 5,213,466 | A * | 5/1993 | Bubik | B60P 1/6463 414/559 |
| 6,158,947 | A | 12/2000 | Goiran et al. | |
| 6,406,247 | B1 | 6/2002 | Ghiretti et al. | |
| 6,962,473 | B2 | 11/2005 | Scranton et al. | |
| 7,568,881 | B1 | 8/2009 | Collins | |
| 7,726,930 | B2 | 6/2010 | Simpson et al. | |
| 8,465,246 | B2 | 6/2013 | Duell et al. | |
| 2020/0198886 | A1 * | 6/2020 | Gosnay | B60P 1/6427 |
| 2021/0253341 | A1 | 8/2021 | Alspach | |

FOREIGN PATENT DOCUMENTS

| | | | |
|---|---|---|---|
| DE | 2557169 A1 * | 8/1976 | B60P 1/6463 |
| GB | 2298856 | 9/1996 | |

* cited by examiner

*Primary Examiner* — James Keenan

(74) *Attorney, Agent, or Firm* — Sand, Sebolt & Wernow Co., LPA

(57) ABSTRACT

A system and methods for translating a cable-specific roll-off dumpster onto a vehicle. The method includes steps of positioning the vehicle proximate to the one of the cable-specific roll-off dumpster and the hook-specific roll-off dumpster; selecting one of a hook member of a hook lift system and a tow ring of an assembly, wherein the hook lift system is operably engaged with the vehicle; and wherein the assembly is operably engaged with the hook lift system; engaging one of the selected hook member and the tow ring to the one of the cable-specific roll-off dumpster and the hook-specific roll-off dumpster; and translating the one of the cable-specific roll-off dumpster and the hook-specific roll-off dumpster relative to the vehicle.

16 Claims, 16 Drawing Sheets

METHOD AND APPARATUS FOR TRANSLATING DUMPSTERS

CROSS REFERENCE TO RELATED APPLICATIONS

This application is a divisional of U.S. application Ser. No. 17/751,055, filed on May 23, 2022; the disclosure of which is incorporated herein by reference.

TECHNICAL FIELD

This present disclosure is generally directed to a dumpster hauling system. More particularly, the present disclosure is directed to a dumpster hauling system for loading and unloading different types of dumpster. Specifically, the present disclosure is directed to an assembly provided on a preexisting hook lift system of a dumpster hauling system for loading and unloading cable-specific roll-off dumpsters without a separate cable and/or pulley assembly.

BACKGROUND

In residential and commercial settings, dumpsters are necessities when disposing of waste materials for residential and commercial projects. To combat this issue, current dumpster removal services provide this disposing service by delivering dumpsters for specific settings and removing dumpsters once the service is no longer needed. Generally, however, delivering and removing these dumpsters require robust systems for loading and unloading dumpsters of various sizes and shapes.

To combat these issues, dumpster hoist and/or lift systems are generally used for loading and unloading different types of dumpsters onto vehicles. In the current market, dumpster removal services use one of two types of dumpsters: cable-specific roll-off dumpsters or hook-specific roll-off dumpsters. As for the cable-specific roll-off dumpster, dumpster removal services use cable-lift systems that are equipped to vehicles where these specific vehicles only load and unload cable-specific roll-off dumpsters. As to hook-specific roll-off dumpsters, dumpster removal services use hook hoist and/or lift systems that are equipped to vehicles where these specific vehicles only load and unload hook-specific roll-off dumpsters. While these solutions are viable, dumpster removal services must have both types of systems equipped to different vehicles in order to utilize cable-specific roll-off dumpsters and hook-specific roll-off dumpsters. In other words, dumpster removal services must have two different fleets of vehicles: one fleet of vehicles equipped with cable-lift systems for cable-specific roll-off dumpsters, and another fleet of vehicles equipped with hook hoist systems for hook-specific roll-off dumpsters.

With these issues, dumpster removal services generally incur higher expenditures in order to utilize both cable-specific roll-off dumpsters and hook-specific roll-off dumpsters to provide dumpster services. Such expenditures include, but not limited to, two types of vehicles with either cable-lift systems and hook hoist systems, labor costs of employing different operators to operate either cable-lift systems or hook hoist systems, fueling costs for both fleets of vehicles, and other expected expenditures of the like.

SUMMARY

The presently disclosed assembly enables operators of these dumpster lift systems to load and unload both cable-specific roll-off dumpsters and hook-specific roll-off dumpsters with a single vehicle. The disclosed assembly operably engaged with a preinstalled hook hoist system enables operators to load and unload cable-specific roll-off dumpsters while still enabling the preinstalled hook hoist system to load and unload hook-specific roll-off dumpsters. The disclosed assembly with the hook lift system may also reduce expenditures, labor costs, and dumpster deliveries for dumpster removal services. The disclosed assembly may also provide waste removal companies an opportunity to gradually phase in modern hook lift equipment where said waste removal companies are limited to using older cable-specific roll off dumpsters for their current fleets and dumpster inventory. As such, the assembly disclosed herein addresses some of the inadequacies of previously known systems for delivering and removing different types of dumpsters.

In one aspect, an exemplary embodiment of the present disclosure may provide a system for translating a cable-specific roll-off dumpster onto a vehicle. The system includes a hook lift system having a control arm. The system also includes an assembly configured to engage with the control arm. The assembly includes a frame rotatably engaged with a hook lift system of the vehicle. The assembly also includes a tow ring rotatably engaged with the frame. The tow ring is adapted to engage a hook of the cable-specific roll-off dumpster. The assembly and the hook lift system translate the cable-specific roll-off dumpster between a loaded position and an unloaded position relative to the vehicle.

This exemplary embodiment or another exemplary embodiment may further include that the frame of the assembly comprises at least one upright support having a first end and a second end; and at least one mounting plate operably engaged with the at least one upright support at the first end of the at least one upright support; wherein the at least one mounting plate is rotatably engaged with the hook lift assembly of the vehicle at a first location on the control arm. This exemplary embodiment or another exemplary embodiment may further include that the assembly further comprises a securement pin operably engaging the at least one mounting plate with the hook lift assembly and having a first end, a second end opposite to the first end, and a longitudinal axis defined therebetween; and wherein the frame is rotatable about the longitudinal axis of the securement pin. This exemplary embodiment or another exemplary embodiment may further include that the frame of the assembly comprises: at least one bracket operably engaged with the at least one upright support at the second end of the at least one upright support; wherein the at least one bracket is moveably engaged with the hook lift assembly of the vehicle at a second location on the control arm. This exemplary embodiment or another exemplary embodiment may further include that the assembly further comprises a retaining member operably engaging the at least one bracket of the frame at the second location on the control arm between a locked position and an unlocked position. This exemplary embodiment or another exemplary embodiment may further include that the at least one bracket of the frame is provided in the locked position when the retaining member operably engages with the at least one bracket and the control arm. This exemplary embodiment or another exemplary embodiment may further include that the at least one bracket of the frame is provided in the unlocked position when the retaining member operably disengages with the at least one bracket and the control arm. This exemplary embodiment or another exemplary embodiment may further include that the tow ring of the assembly comprises: a first end; a second end opposite to the first end; a first surface extending between the first end and the second end; a second surface extending between the first end and the second end opposite to the first surface; and an opening defined between the first end and the second end of the tow ring and extending from the first surface to the second surface; wherein the opening of the tow ring is adapted to receive a hook of the cable-specific roll-off dumpster when the tow ring operably engages with the hook of the cable-specific roll-off dumpster. This exemplary embodiment or another exemplary embodiment may further include that the tow ring of the assembly further comprises: a first guide extending from the first surface of the tow ring; and a second guide extending from the first surface of the tow ring opposite to the first guide bar; wherein the first guide and the second guide are adapted to maintain the hook of the cable-specific roll-off dumpster inside of the opening of the tow ring. This exemplary embodiment or another exemplary embodiment may further include that the assembly further comprises: a locking pin operably engaging the tow ring with the frame and having a first end, a second end, and a longitudinal axis defined therebetween; wherein the tow ring is rotatable about the longitudinal axis of the locking pin. This exemplary embodiment or another exemplary embodiment may further include that the tow ring of the assembly further comprises: a passageway defined at the second end of the tow ring; wherein the passageway is configured to receive the locking pin to enable the locking pin to operably engage with the tow ring. This exemplary embodiment or another exemplary embodiment may further include that the assembly further comprises: at least one latching mechanism operably engaged with the frame; wherein the at least one latching mechanism is configured to be moveable between an extended position and a retracted position for providing the tow ring between a retracted position and a released position. This exemplary embodiment or another exemplary embodiment may further include that the tow ring is provided in the retracted position when the at least one latching mechanism is provided in the extended position. This exemplary embodiment or another exemplary embodiment may further include that the tow ring is provided in the released position when the at least one latching mechanism is provided in the retracted position. This exemplary embodiment or another exemplary embodiment may further include that the at least one latching mechanism comprises: a pin; a housing operably engaged with the pin; and a biaser operably engaged with the pin and the housing; wherein the pin is biased between the extended position and the retracted position relative to the housing via the biaser.

In another aspect, and exemplary embodiment of the present disclosure may provide a method of translating one of a cable-specific roll-off dumpster and a hook-specific roll-off dumpster relative to a vehicle. The method comprises steps of: positioning the vehicle proximate to the one of the cable-specific roll-off dumpster and the hook-specific roll-off dumpster; selecting one of a hook member of a hook lift system and a tow ring of an assembly, wherein the hook lift system is operably engaged with the vehicle; and wherein the assembly is operably engaged with the hook lift system; engaging one of the selected hook member and the tow ring to the one of the cable-specific roll-off dumpster and the hook-specific roll-off dumpster; and translating the one of the cable-specific roll-off dumpster and the hook-specific roll-off dumpster relative to the vehicle.

This exemplary embodiment or another exemplary embodiment may further include steps inputting a first input on the hook lift system, via a power mechanism, to move the hook lift system and the assembly proximate away from the vehicle and towards the one of the cable-specific roll-off dumpster and the hook-specific roll-off dumpster; and inputting a second input on the hook lift system, via the power mechanism, to move the hook lift system and the assembly towards the vehicle with the one of the cable-specific roll-off dumpster and the hook-specific roll-off dumpster. This exemplary embodiment or another exemplary embodiment may further include that wherein the step of selecting one of the hook member of the hook lift system and the tow ring of the assembly further includes selecting the hook member of the hook lift system with the hook-specific roll-off dumpster; wherein the step of engaging one of the selected hook member and the tow ring to the one of the cable-specific roll-off dumpster and the hook-specific roll-off dumpster further includes engaging the hook member of the hook lift system with the hook-specific roll-off dumpster; and wherein the step of translating the one of the cable-specific roll-off dumpster and the hook-specific roll-off dumpster relative to the vehicle further includes translating the hook-specific roll-off dumpster. This exemplary embodiment or another exemplary embodiment may further include that wherein the step of selecting one of the hook member of a hook lift system and the tow ring of the assembly further includes selecting the tow ring of the assembly with the cable-specific roll-off dumpster; wherein the step of engaging one of the selected hook member and the tow ring to the one of the cable-specific roll-off dumpster and the hook-specific roll-off dumpster further includes engaging the tow ring of the assembly with the cable-specific roll-off dumpster; and wherein the step of translating the one of the cable-specific roll-off dumpster and the hook-specific roll-off dumpster relative to the vehicle further includes translating the cable-specific roll-off dumpster. This exemplary embodiment or another exemplary embodiment may further include steps of removing a retaining member of the assembly from a frame of the assembly; rotating the frame and the tow ring of the assembly, via a retaining pin of the assembly, away from a control arm of the hook lift system; and providing the tow ring of the assembly from a retracted position to an extended position via the at least one latching mechanism of the assembly. This exemplary embodiment or another exemplary embodiment may further include a step of engaging the retaining member of the assembly into the frame of the assembly when the cable-specific roll-off dumpster is provided on the vehicle. This exemplary embodiment or another exemplary embodiment may further include a step of guiding a hook of the cable-specific roll-off dumpster into the tow ring via a first guide bar and a second guide bar provided on the tow ring. This exemplary embodiment or another exemplary embodiment may further include steps of removing the retaining member of the assembly from the frame of the assembly; translating the cable-specific roll-off dumpster from the vehicle to a ground surface via the assembly and the control arm; rotating the frame and the tow ring of the assembly, via a retaining pin of the assembly, away from the control arm of the hook lift system; disengaging the hook of the cable-specific roll-off dumpster from inside of the tow ring; and reengaging the retaining member of the assembly into the frame of the assembly when the cable-specific roll-off dumpster is provided on the vehicle. This exemplary embodiment or another exemplary embodiment may further include a step of providing the tow ring of the assembly from the extended position to the retracted position via the at least one latching mechanism of the assembly.

This exemplary embodiment or another exemplary embodiment may further include that the step of selecting one of the hook member of the hook lift system and the tow ring of the assembly further includes selecting the tow ring of the assembly with the cable-specific roll-off dumpster; wherein the step of engaging one of the selected hook member and the tow ring to the one of the cable-specific roll-off dumpster and the hook-specific roll-off dumpster further includes engaging the tow ring of the assembly with the cable-specific roll-off dumpster; and wherein the step of translating the one of the cable-specific roll-off dumpster and the hook-specific roll-off dumpster relative to the vehicle further includes translating the cable-specific roll-off dumpster. This exemplary embodiment or another exemplary embodiment may further include steps of removing a retaining member of the assembly from a frame of the assembly; and rotating the frame and the tow ring of the assembly away from a control arm of the hook lift system. This exemplary embodiment or another exemplary embodiment may further include steps of removing the retaining member of the assembly from the frame of the assembly; translating the cable-specific roll-off dumpster from the vehicle to a ground surface via the assembly and the control arm; rotating the frame and the tow ring of the assembly away from the control arm of the hook lift system; disengaging a hook of the cable-specific roll-off dumpster from inside of the tow ring; and reengaging the retaining member of the assembly into the frame of the assembly when the cable-specific roll-off dumpster is provided on the vehicle. This exemplary embodiment or another exemplary embodiment may further include a step of moving the tow ring of the assembly from an extended position to a retracted position via at least one latching mechanism of the assembly. This exemplary embodiment or another exemplary embodiment may further include that the step of engaging the frame of the assembly with the control arm of the hook lift system at the first position further comprises: engaging at least one upright support of the frame to the control arm; engaging at least one mounting plate with the at least one upright support at a first end of the at least one upright support; and rotatably engaging the at least one mounting plate with the control arm at the first position. This exemplary embodiment or another exemplary embodiment may further include that the step of rotatably engaging the at least one mounting plate with the control arm at the first position further comprises: engaging a securement pin with the at least one mounting plate and the control arm of the hook lift system; wherein the frame is rotatable about a longitudinal axis of the securement pin. This exemplary embodiment or another exemplary embodiment may further include that the step of rotatably engaging the at least one mounting plate with the control arm at the first position further comprises: engaging at least one bracket with the at least one upright support at a second end of the at least one upright support opposite to the first end of the at least one upright support; wherein the at least one bracket is moveably engaged with the control arm at the second position on the control arm. This exemplary embodiment or another exemplary embodiment may further include that the at least one bracket of the frame is in the locked position when the retaining member operably engages with the at least one bracket and the control arm. This exemplary embodiment or another exemplary embodiment may further include that the at least one bracket of the frame is in the unlocked position when the retaining member operably disengages from the at least one bracket and the control arm. This exemplary embodiment or another exemplary embodiment may further include when the frame is in the locked position, the frame is rotatably engaged with the control arm at the first position and engaged with the control arm by the retaining member at the second position. This exemplary embodiment or another exemplary embodiment may further include that when the frame is in in the unlocked position, the frame is rotatably engaged with the control arm at the first position and is free from engaging with the control arm and the retaining member at the second position. This exemplary embodiment or another exemplary embodiment may further include engaging a latching mechanism with the frame and the tow ring; and positioning the tow ring in a retracted position or in a released position via the latching mechanism. This exemplary embodiment or another exemplary embodiment may further include that the tow ring is in the retracted position when the latching mechanism is in an extended position; and wherein the tow ring is in the released position when the latching mechanism is in a stored position.

In another aspect, and exemplary embodiment of the present disclosure may provide a method of translating one of a cable-specific roll-off dumpster and a hook-specific roll-off dumpster relative to a vehicle. The method comprises steps of: positioning the vehicle proximate to the one of the cable-specific roll-off dumpster and the hook-specific roll-off dumpster; selecting one of a hook member of a hook lift system and a tow ring of an assembly, wherein the hook lift system is operably engaged with the vehicle; and wherein the assembly is operably engaged with the hook lift system; engaging a frame of the assembly with a control arm of the hook lift system at a first position; selectively engaging the frame of the assembly with the control arm of the hook lift system at a second position, by a retaining member of the assembly, between a locked position and an unlocked position; engaging one of the selected hook member and the tow ring to the one of the cable-specific roll-off dumpster and the hook-specific roll-off dumpster; and translating the one of the cable-specific roll-off dumpster and the hook-specific roll-off dumpster relative to the vehicle.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
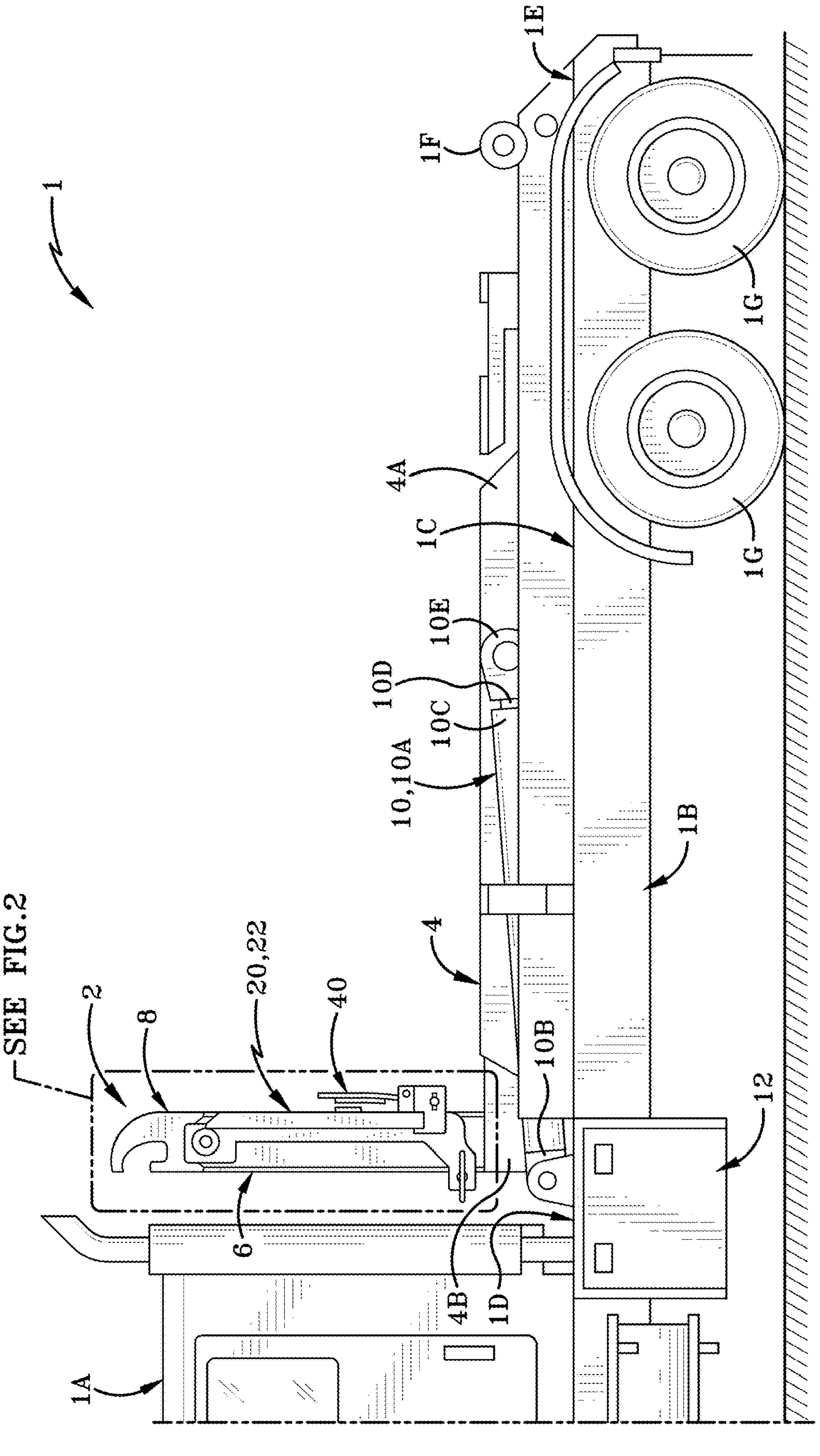
FIG. 1 is a left side elevation view of a vehicle having a preinstalled hook lift system operably engaged with an assembly in one aspect of the present disclosure.

FIG. 1 illustrates a vehicle, which is generally indicated by the reference number 1. It will be understood that the illustrated vehicle 1 is exemplary only and any type of vehicle is contemplated to be represented by the illustrated vehicle. Such vehicles considered suitable herein include all-terrain vehicles, cars, sport utility vehicles (SUV), pickup trucks, trailers, vans, recreational vehicles, commercial trucks, semi-trucks, flatbed trucks, and other similar vehicles for the purpose of loading and unloading dumpsters and/or waste containers. In the illustrated embodiment, the vehicle 1 is a flatbed truck that is configured for loading and unloading dumpsters and/or waste containers, which is described in more detail below.

Referring to FIG. 1, the vehicle 1 has a cab 1A operably engaged with a chassis 1B of the vehicle 1. The vehicle 1 also includes a flatbed 1C that is defined by the chassis 1B and is disposed behind the cab 1A. The flatbed 1C includes a front end 1D that is positioned proximate to the cab 1A. The flatbed 1C also includes a rear end 1E positioned longitudinally opposite to the front end 1D at a distance away from the cab 1A. The vehicle 1 also includes at least one roller 1F positioned between the front end 1D and the rear end 1E of the flatbed 1C. In the illustrated embodiment, the at least one roller 1F is positioned proximate to the rear end 1E of the flatbed 1C. The vehicle 1 also includes wheel assemblies 1G for enabling the vehicle 1 to travel.

Figure 10:
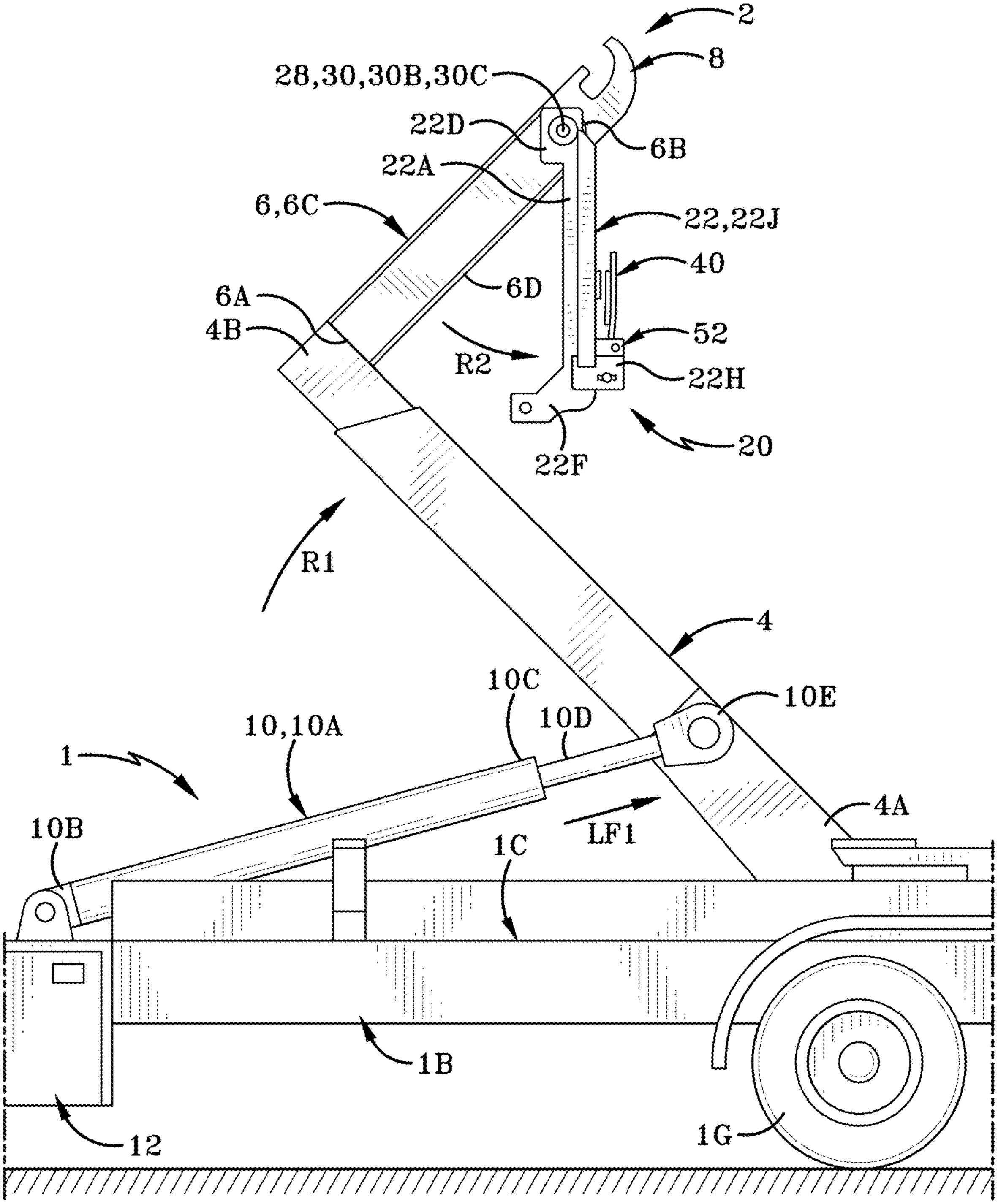
FIG. 10 is another operational view similar to FIG. 9, but the hook lift system moves the assembly from a front end of a flatbed of the vehicle to a rear end of the flatbed of the vehicle.

Referring to FIGS. 1 and 10, a preinstalled hook lift system 2 is provided with the vehicle 1. As provided herein, the hook lift system 2 is provided on the flatbed 1C of the vehicle 1 where the hook lift system 2 is capable to translate a hook-specific roll-off dumpster between a ground surface and the vehicle 1 for delivery and pick-up/removal operations. The hook lift system 2 may be any suitable hook lift system that is capable of translating a hook-specific roll-off dumpster between a ground surface and a vehicle having the hook lift system for delivery and pick-up/removal operations. In one exemplary embodiment, a hook lift system provided on a vehicle may be a SwapLoader® Hook Lift Hoist System that is capable of translating a hook-specific roll-off dumpster between a ground surface and a vehicle having the hook lift system for delivery and pick-up/removal operations. In other exemplary embodiment, any suitable preexisting hook lift system or available hook lift system may be used that is capable of translating a hook-specific roll-off dumpster between a ground surface and a vehicle having the hook lift system for delivery and pick-up/removal operations.

Still referring to FIGS. 1 and 10, the hook lift system 2 includes a base arm 4 that pivotably engages with one or both of the chassis 1B and the flatbed 1C of the vehicle 1. As such, the base arm 4 is enabled to be pivotably moveable relative to one or both of the chassis 1B and the flatbed 1C when translating dumpsters on and from the vehicle 1. The base arm 4 includes a first end 4A that operably engages with one or both of the chassis 1B and the flatbed 1C of the vehicle 1. The base arm 4 also includes a second end 4B opposite to the first end 4A and free from engaging the one or both of the chassis 1B and the flatbed 1C of the vehicle 1. Such operation of the base arm 4 of the hook lift system 2 is provided in more detail below.

Figure 11:
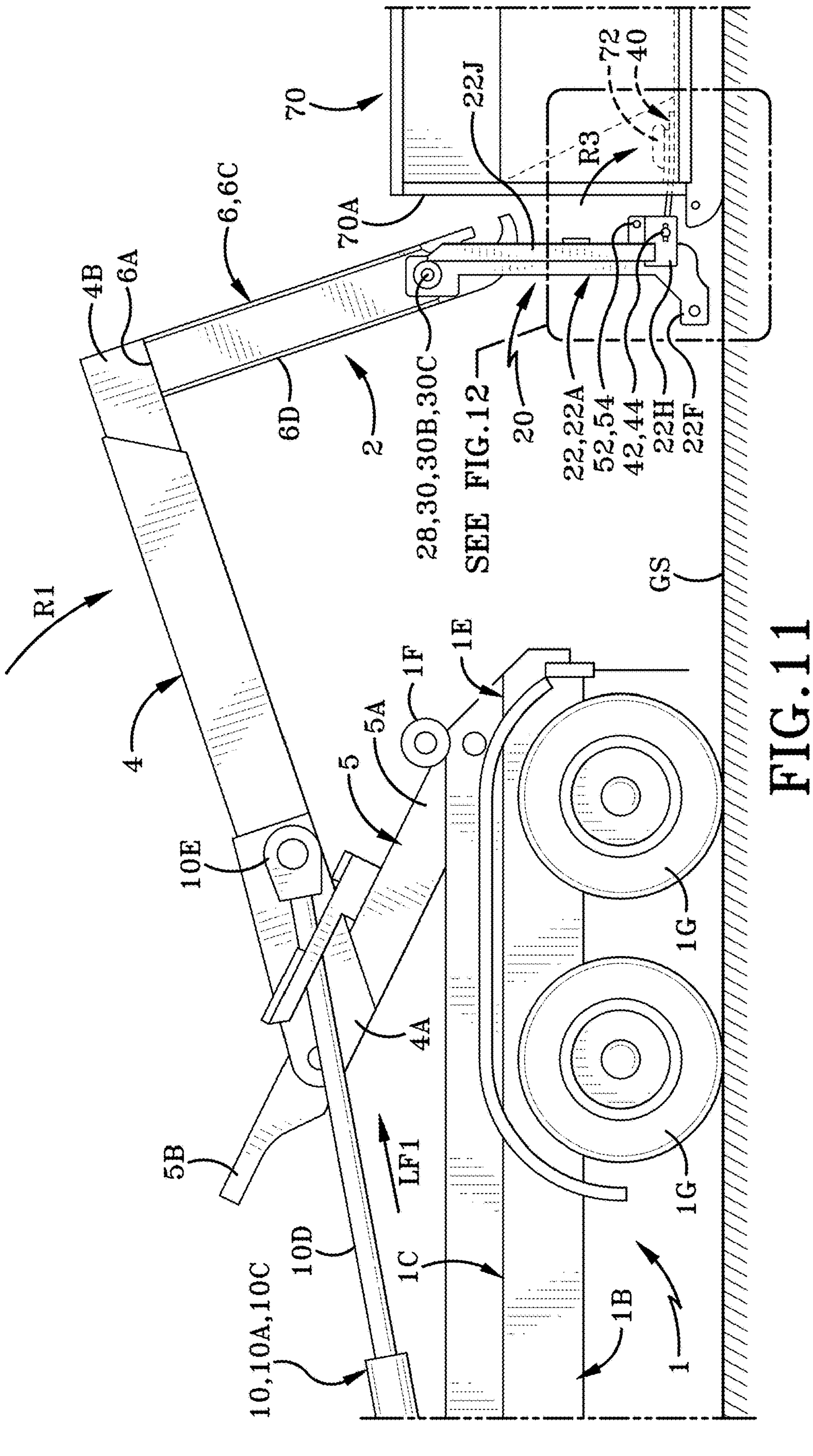
FIG. 11 is another operational view similar to FIG. 10, but the tow ring of the assembly is provided in the released position and positioned over a hook of the cable-specific roll-off dumpster.

Referring to FIGS. 1 and 11, the hook lift system 2 also include a tilt securement frame 5 operably engaged with the chassis 1B and the base arm 4. As illustrated in FIG. 11, the tilt securement frame 5 includes a first end 5A pivotably engaged with the chassis 1B proximate to the rear end 1E of the flatbed 1C. Still referring to FIG. 11, the tilt securement frame 5 also includes a second end 5B opposite to the first end 5A and free from engaging the vehicle 1. The base arm 4 also operably engages with the tilt securement frame 5 at a location between the first and second ends 5A, 5B. The tilt securement frame 5 is configured to operably engaged with either a cable-specific roll-off dumpster or a hook-specific roll-off dumpster to assist in securing the dumpster with the vehicle 1 while traveling. The tilt securement frame 5 is also configured to guide either a cable-specific roll-off dumpster or a hook-specific roll-off dumpster onto the vehicle 1 when translating the dumpster on and off the vehicle 1.

Still referring to FIGS. 1 and 10, the hook lift system 2 also includes a control arm 6 that operably engages with the base arm 4. As provided herein, the control arm 6 is fixedly attached with the base arm 4 in that the control arm 6 is fixed orthogonally to the base arm 4. The control arm 6 includes a first or top end 6A that operably engages with the second end 4B of the base arm 4 to maintain the control arm 6 at a fixed position relative to the base arm 4. The control arm 6 also includes a second or bottom end 6B that is positioned opposite to the first end 6A and is provided remote from the base arm 4 at a distance away from the base arm 4. The control arm 6 also includes a front or third end 6C that extends longitudinally between the first end 6A and second end 6B and faces the front end 1D of the flatbed 1C towards the cab 1A. The control arm 6 also includes a rear or fourth end 6D that extends longitudinally between the first end 6A and second end 6B and faces the rear end 1E of the flatbed 1C away the cab 1A. The control arm 6 also defines a through-hole 6E proximate to the second end 6B of the control arm 6 (see FIG. 6); such use and purpose of the through-hole 6E is described in more detail below. The operation of the control arm 6 of the hook lift system 2 is also provided in more detail below.

Referring to FIGS. 1-6, the hook lift system 2 also includes a hook member 8 that operably engages with the control arm 6. As illustrated herein, the hook member is rotatable between a first hook 8A and a second hook (not illustrated) positioned opposite to the first hook 8A on the hook member 8. In other exemplary embodiments, a hook member may have any suitable number of hooks for operably engaging with any suitable number of hook-specific roll-off dumpsters. Generally, the hook member 8 is configured to engage with any suitable hook-specific roll-off dumpster that may be translated between a ground surface and the vehicle 1 with the hook lift system 2. In one instance, the first hook 8A of the hook member 8 is configured to engage with a hook-specific roll-off dumpster having a first configuration where a hook lift system 2 may translate the hook-specific roll-off dumpster between a ground surface and the vehicle 1. In another instance, the second hook of the hook member 8 is configured to engage with a hook-specific roll-off dumpster having a second, different configuration where the hook lift system may translate the hook-specific roll-off dumpster between a ground surface and the vehicle 1. The hook member 8 also defines a through-hole 8B that extends transversely through the hook member 8 (see FIG. 6). Upon assembly, the through-hole 8B of the hook member 8 is coaxial with the through-hole 6E of the control arm 6 (see FIG. 6).

Referring to FIGS. 1 and 10-11, the hook lift system 2 also includes at least one actuator 10 operably engaged with one or both of the chassis 1B and the flatbed 1C and operably engaged with the base arm 4. The at least one actuator 10 includes a cylinder 10A having a first end 10B that operably engages with one or both of the chassis 1B and the flatbed 1C. The cylinder 10A also includes a second end 10C that is opposite to the first end 10B and free from engaging one or both of the chassis 1B and the flatbed 1C. The at least one actuator 10 also includes a piston rod 10D that is movably engaged with the cylinder 10A. The piston rod 10D is also operably engages with the base arm 4 at a position between the first end 4A and the second end 4B of the base arm 4 via a mounting member—10E.

As illustrated herein, the at least one actuator 10 is configured to pivot and/or articulate the base arm 4 and the control arm 6 via a power mechanism 12 between a collapsed position and an extended position for translating a dumpster from vehicle 1 and on to the vehicle 1. During operation, a first input may be applied to the power mechanism 12 to enable the at least one actuator 10 to pivot the articulate the base arm 4 and the control arm 6 away from the rear end 1E of the flatbed 1C towards the cab 1A for loading dumpster onto the vehicle 1. During operation, a second input may be applied to the power mechanism 12 to enable the at least one actuator 10 to pivot the articulate the base arm 4 and the control arm 6 away from the cab 1A and towards the rear end 1E of the flatbed 1C for unloading a dumpster onto the vehicle 1. Such operation of the hook lift system 2 is described in more detail below In the illustrated embodiment, the at least one actuator 10 and the power mechanism 12 of the hook lift system 2 are hydraulically-driven and/or powered for pivoting the base arm 4 and the control arm 6 between a collapsed position and an extended position. In other exemplary embodiments, at least one actuator and a power mechanism of a hook lift system may be driven and/or powered by any suitable power source. In one exemplary embodiment, at least one actuator and a power mechanism of a hook lift system may be driven and/or powered pneumatically. In another exemplary embodiment, at least one actuator and a power mechanism of a hook lift system may be driven and/or powered electrically. In one exemplary embodiment, at least one actuator and a power mechanism of a hook lift system may be driven and/or powered by any other suitable power source available.

Referring to FIGS. 1-7 and 9-15, an assembly 20 is operably engaged with the hook lift system 2 at at least one position. The assembly 20 is considered advantageous at least because the assembly 20 enables an operator to load and unload a cable-specific roll-off dumpster with the assembly 20 or a hook-specific roll-off dumpster with the hook member 8 without interfering with or impeding on the function of the hook member 8. Such components and operation of the assembly 20 is described in more detail below.

The assembly 20 includes a frame 22 that operably engages with the control arm 6 of the hook lift system 2. As illustrated in FIGS. 1-6, the frame 22 operably engages with the control arm 6 of the hook lift system 2 at a first position proximate to the second end 6B of the control arm 6. At the first position, the frame 22 is rotatable about the control arm 6 at the first position. The frame 22 is also selectively engaged with the control arm 6 of the hook lift system 2 at a second position proximate to the first end 6A of the control arm 6. At the second position, the frame 22 may be provided between a fixed position (see FIGS. 1-5) proximate to the control arm 6 and a rotated position (see FIGS. 9-15) away from the control arm 6.

The frame 22 of the assembly 20 is a unibody that is formed as a unitary, monolithic member substantially fabricated from a rigid, manmade, material. In one example, metal or metal alloys, such as stainless steel or aluminum alloy, may form a substantial majority of the components or elements used to fabricate the tool body and the various components integrally formed, molded, or extruded therewith. While it is contemplated that the frame 22 and its additional components described herein are uniformly and integrally formed as a unitary, monolithic member, it is entirely possible that the components of the frame 22 be formed separately from alternative materials as one having routine skill in the art would understand. Furthermore, while the components of the frame 22 are discussed below individually, it is to be clearly understood that the components and their corresponding reference elements of the frame 22 are members, portions, regions, or surfaces of the frame 22 and all form a respective element or component of the unitary frame 22. Thus, while the components may be discussed individually and identified relative to other elements or components of the tool body, in this exemplary embodiment, there is a frame 22 having the below described portions, regions, or surfaces.

Figure 6:
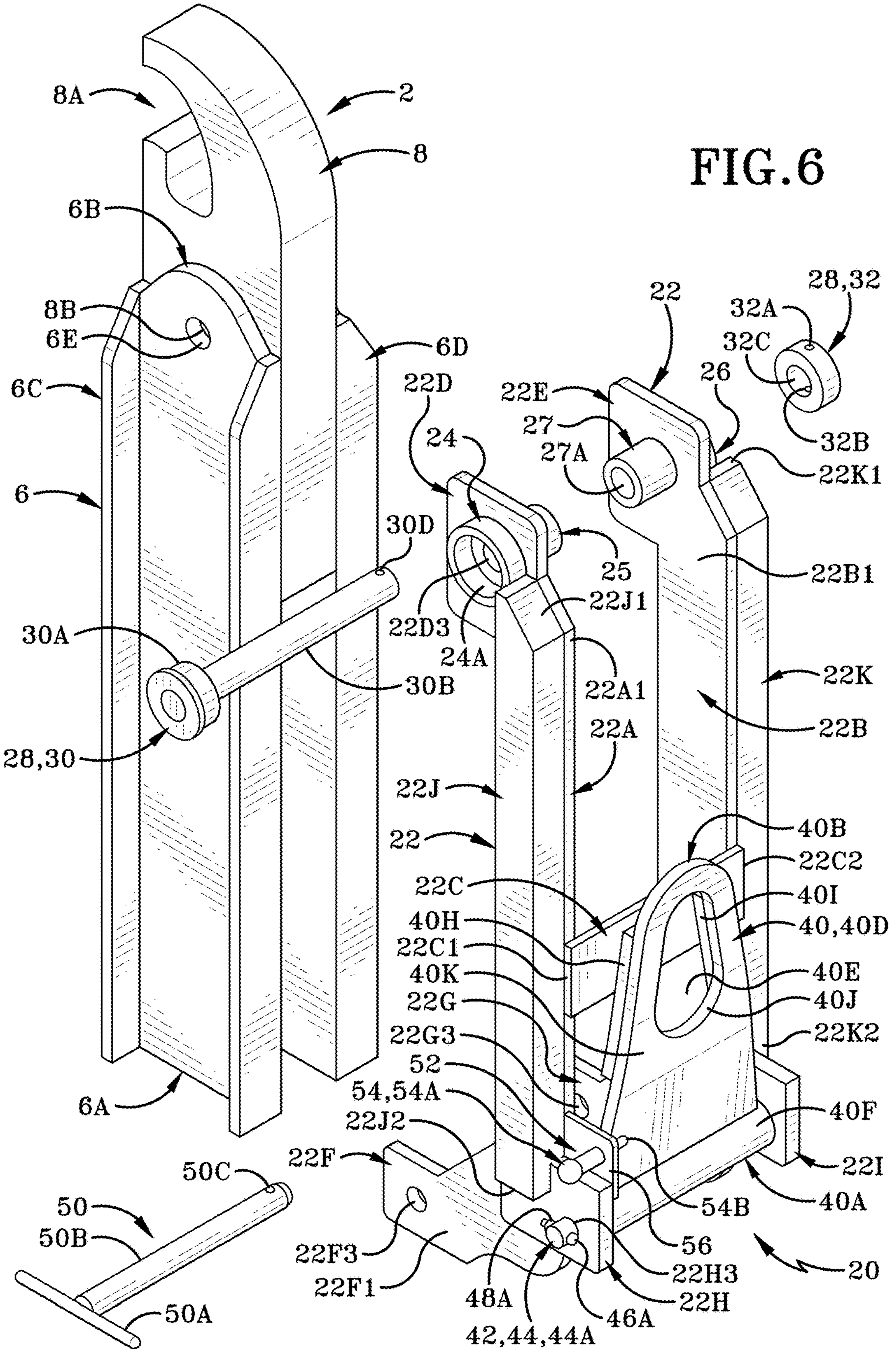
FIG. 6 is an exploded perspective view of the control arm of the preinstalled hook lift system and the assembly, wherein a tow ring of the assembly is provided in a retracted position relative to a frame of the assembly.

Referring to FIG. 6, the frame 22 includes at least one upright support that operably engages the frame 22 with the control arm 6 at the first position. In the illustrated embodiment, the frame 22 includes a first upright support 22A and a second upright support 22B that operably engages the frame 22 with the control arm 6 at the first position. As illustrated in FIG. 6, the first upright support 22A and the second upright support 22B of the frame 22 are substantially similar to one another and operably engaged with at least a cross bar 22C in a mirrored orientation.

Still referring to FIG. 6, the first upright support 22A includes a top end 22A1, a bottom end 22A2 that opposes the top end 22A1, and a longitudinal axis defined therebetween. Similarly, the second upright support 22B includes a top end 22B1, a bottom end 22B2 that opposes the top end 22B1, and a longitudinal axis defined therebetween. In the illustrated embodiment, the top end 22A1 of the first upright support 22A is adjacent to the top end 22B1 of the second upright support 22B, and the bottom end 22A2 of the first upright support 22A is adjacent to the bottom end 22B2 of the second upright support 22B.

Still referring to FIG. 6, the cross bar 22C operably engages with the first upright support 22A and the second upright support 22B orthogonal to the longitudinal axes of the first upright support 22A and the second upright support 22B. The cross bar 22C includes a first end 22C1 that operably engages with the first upright support 22A at a position between the first end 22A1 and the second end 22A2 of the first upright support 22A. The cross bar 22C also includes a second end 22C2 that opposes the first end 22C1 and operably engages with the second upright support 22B at a position between the first end 22B1 and the second end 22B2 of the second upright support 22B. As stated previously, the cross bar 22C provides at least one support between the first upright support 22A and the second upright support 22B.

Still referring to FIG. 6, the frame 22 includes at least one mounting plate provided with at least one upright support. In the illustrated embodiment, the frame 22 includes a first mounting plate 22D operably engaged with the first upright support 22A, and a second mounting plate 22E operably engaged with the second upright support 22B. The first mounting plate 22D and the second mounting plate 22E operably engages with the control arm 6 at the first position. As illustrated in FIG. 6, the first mounting plate 22D and the second mounting plate 22E of the frame 22 are substantially similar to one another and operably engaged with the first upright support 22A and the second upright support 22B in a mirrored orientation.

Still referring to FIG. 6, the first mounting plate 22D is positioned at the top end 22A1 of the first upright support 22A. The first mounting plate 22D includes an outer surface 22D1 and an inner surface 22D2 that opposes the outer surface 22D1. The first mounting plate 22D also defines a first opening 22D3 that extends entirely through the first mounting plate 22D along an axis orthogonal to the longitudinal axis of the first upright support 22A. The first opening 22D3 also provides fluid communication between the outer surface 22D1 and the inner surface 22D2. Upon assembly, the first opening 22D3 of the first mounting plate 22D is aligned and coaxial with the through-hole 6E of the control arm 6 and the through-hole 8B of the hook member 8. Upon assembly, the outer surface 22D1 faces away from the control arm 6, and the inner surface 22D2 faces and is adjacent to the control arm 6.

Similar to the first mounting plate 22D, the second mounting plate 22E is positioned at the top end 22B1 of the second upright support 22B. The second mounting plate 22E includes an outer surface 22E1 and an inner surface 22E2 that opposes the outer surface 22E1. The second mounting plate 22E also defines a second opening 22E3 that extends entirely through the second mounting plate 22E along an axis orthogonal to the longitudinal axis of the second upright support 22B. The second opening 22E3 also provides fluid communication between the outer surface 22E1 and the inner surface 22E2. Upon assembly, the second opening 22E3 of the second mounting plate 22E is aligned and coaxial with the through-hole 6E of the control arm 6, the through-hole 8B of the hook member 8, and the first opening 22D3 of the first mounting plate 22D. Upon assembly, the outer surface 22E1 faces away from the control arm 6, and the inner surface 22E2 faces towards and is adjacent to the control arm 6.

Still referring to FIG. 6, the frame 22 includes at least one bracket provided with at least one upright support. In the illustrated embodiment, the frame 22 includes a first bracket 22F operably engaged with the first upright support 22A, and a second bracket 22G operably engaged with the second upright support 22B. The first bracket 22F and the second bracket 22G may be selectively fixed with the control arm 6 at the second position, which is described in more detail below. As illustrated in FIG. 6, the first bracket 22F and the second bracket 22G of the frame 22 are substantially similar to one another and operably engaged with the first upright support 22A and the second upright support 22B in a mirrored orientation.

Still referring to FIG. 6, the first bracket 22F is positioned at the bottom end 22A2 of the first upright support 22A. The first bracket 22F includes an outer surface 22F1 and an inner surface 22F2 that opposes the outer surface 22F1. The first bracket 22F also defines a first aperture 22F3 that extends entirely through the first bracket 22F along an axis orthogonal to the longitudinal axis of the first upright support 22A. The first aperture 22F3 also provides fluid communication between the outer surface 22F1 and the inner surface 22F2. The first aperture 22F3 of the first bracket 22F may be positioned forwardly of the front end 6C of the control arm 6 towards the cab 1A when the frame 22 is secured to the control arm 6 at the second position (see FIGS. 1-5). The first aperture 22F3 of the first bracket 22F may also be positioned rearwardly of the rear end 6D of the control arm 6 away from the cab 1A when the frame 22 is free from being secured to the control arm 6 at the second position (see FIGS. 10-15). Upon assembly, the outer surface 22F1 faces away from the control arm 6, and the inner surface 22F2 faces towards and is adjacent to the control arm 6 when the frame 22 is secured to the control arm 6 at the second position (see FIGS. 1-5).

Still referring to FIG. 6, the second bracket 22G is positioned at the bottom end 22B2 of the second upright support 22B. The second bracket 22G includes an outer surface 22G1 and an inner surface 22G2 that opposes the outer surface 22G1. The second bracket 22G also defines a second aperture 22G3 that extends entirely through the second bracket 22G along an axis orthogonal to the longitudinal axis of the second upright support 22B. The second aperture 22G3 also provides fluid communication between the outer surface 22G1 and the inner surface 22G2. The second aperture 22G3 of the second bracket 22G may be positioned forwardly of the front end 6C of the control arm 6 towards the cab 1A when the frame 22 is secured to the control arm 6 at the second position (see FIGS. 1-5). The second aperture 22G3 of the second bracket 22G may also be positioned rearwardly of the rear end 6D of the control arm 6 away from the cab 1A when the frame 22 is free from being secured to the control arm 6 at the second position (see FIGS. 10-15). Upon assembly, the outer surface 22G1 faces away from and is remote from the control arm 6, and the inner surface 22G2 faces and is adjacent to the control arm 6 when the frame 22 is secured to the control arm 6 at the second position (see FIGS. 1-5).

Still referring to FIG. 6, the frame 22 includes at least one extension provided with at least one upright support. In the illustrated embodiment, the frame 22 includes a first extension 22H operably engaged with the first upright support 22A, and a second extension 22I operably engaged with the second upright support 22B. As illustrated in FIG. 6, the first extension 22H and the second extension 22I of the frame 22 are substantially similar to one another and operably engaged with the first upright support 22A and the second upright support 22B in a mirrored orientation.

Still referring to FIG. 6, the first extension 22H is positioned at the bottom end 22A2 of the first upright support 22A. The first extension 22H also extends away from the first bracket 22F while the first bracket 22F and the first extension 22H are adjacent to one another. The first extension 22H includes an outer surface 22H1 and an inner surface 22H2 that opposes the outer surface 22H1. The first extension 22H also defines a first hole 22H3 that extends entirely through the first extension 22H along an axis orthogonal to the longitudinal axis of the first upright support 22A. The first hole 22H3 also provides fluid communication between the outer surface 22H1 and the inner surface 22H2. Such use and purpose of the first hole 22H3 defined in the first extension 22H is described in more detail below.

Similar to the first extension 22H, the second extension 22I is positioned at the bottom end 22B2 of the second upright support 22B. The second extension 22I also extends away from the second bracket 22G while the second bracket 22G and the second extension 22I are adjacent to one another. The second extension 22I includes an outer surface 22I1 and an inner surface 22I2 that opposes the outer surface 22I1. The second extension 22I also defines a second hole 22I3 that extends entirely through the second extension 22I along an axis orthogonal to the longitudinal axis of the second upright support 22B. The second hole 22I3 also provides fluid communication between the outer surface 22I1 and the inner surface 22I2. In the illustrated embodiment, the first hole 22H3 defined by the first extension 22H and the second hole 22I3 defined by the second extension 22I are aligned and coaxial with one another. Such use and purpose of the second hole 22I3 defined in the second extension 22I is described in more detail below.

Still referring to FIG. 6, the frame 22 also includes a first brace 22J that operably engages with the first upright support 22A. The first brace 22J includes a first end 22J1 positioned proximate to the first end 22A1 of the first upright support 22A. The first brace 22J also includes a second end 22J2 positioned proximate to the second end 22A2 of the first upright support 22A. Still referring to FIG. 6, the frame 22 also includes a second brace 22K that is substantially similar to the first brace 22J. The second brace 22K operably engages with the second upright support 22B opposite to the first brace 22J. The second brace 22K includes a first end 22K1 positioned proximate to the first end 22B1 of the second upright support 22B. The second brace 22K also includes a second end 22K2 positioned proximate to the second end 22B2 of the second upright support 22B. Each of the first and second braces 22J, 22K may provide vertical support to the first and second upright supports 22A, 22B when translating a dumpster between a ground surface and the vehicle 1.

Still referring to FIG. 6, the assembly 20 also includes at least one tubular member that operably engages with at least one mounting plate of the frame 22. In the illustrated embodiment, the assembly 20 includes a first outer tubular member 24 that operably engages with the first mounting plate 22D on the outer surface 22D1. The first outer tubular member 24 also defines a passageway 24A that extends entirely through the first outer tubular member 24 and is axially aligned with the first opening 22D3 of the first mounting plate 22D. The assembly 20 also includes a first inner tubular member 25 that operably engages with the first mounting plate 22D on the inner surface 22D2 opposing the first outer tubular member 24 on the first mounting plate 22D. The first inner tubular member 25 also defines a passageway 25A that extends entirely through the first inner tubular member 25; the passageway 25A is axially aligned with the first opening 22D3 of the first mounting plate 22D and the passageway 24A of the first outer tubular member 24. Such purposes of the first outer tubular member 24 and the first inner tubular member 25 are described in more detail below.

While the first outer tubular member 24 and the first inner tubular member 25 are described as separate member, any suitable configuration may be provided between a first outer tubular member and a first inner tubular member. In one exemplary embodiment, a first outer tubular member and a first inner tubular member may be a single, unitary member that operably engages with a first mounting plate via a first opening defined by the first mounting plate. In another exemplary embodiment, a component and/or part may be provided with one or both of a first outer tubular member and a first inner tubular member described herein to constrain relative motion and reduce friction between one or both of the first outer tubular member and the first inner tubular member when a separate, rotational member is provided inside of one or both of the first outer tubular member and a first inner tubular member.

The assembly 20 also includes a second outer tubular member 26 that operably engages with the second mounting plate 22E on the outer surface 22E1. The second outer tubular member 26 also defines a passageway 26A that extends entirely through the second outer tubular member 26 and is axially aligned with the second opening 22E3 of the second mounting plate 22E. The assembly 20 also includes a second inner tubular member 27 that operably engages with the second mounting plate 22E on the inner surface 22E2 opposing the second outer tubular member 26 on the second mounting plate 22E. The first inner tubular member 25 also defines a passageway 27A that extends entirely through the second inner tubular member 27; the passageway 27A is axially aligned with the second opening 22E3 of the second mounting plate 22E and the passageway 26A of the second outer tubular member 26.

While the second outer tubular member 26 and the second inner tubular member 27 are described as separate member, any suitable configuration may be provided between a second outer tubular member and a second inner tubular member. In one exemplary embodiment, a second outer tubular member and a second inner tubular member may be a single, unitary member that operably engages with a second mounting plate via a second opening defined by the second mounting plate. In another exemplary embodiment, a component and/or part may be provided with one or both of a second outer tubular member and a second inner tubular member described herein to constrain relative motion and reduce friction between one or both of the second outer tubular member and the second inner tubular member when a separate, rotational member is provided inside of one or both of the second outer tubular member and a second inner tubular member.

Figure 5:
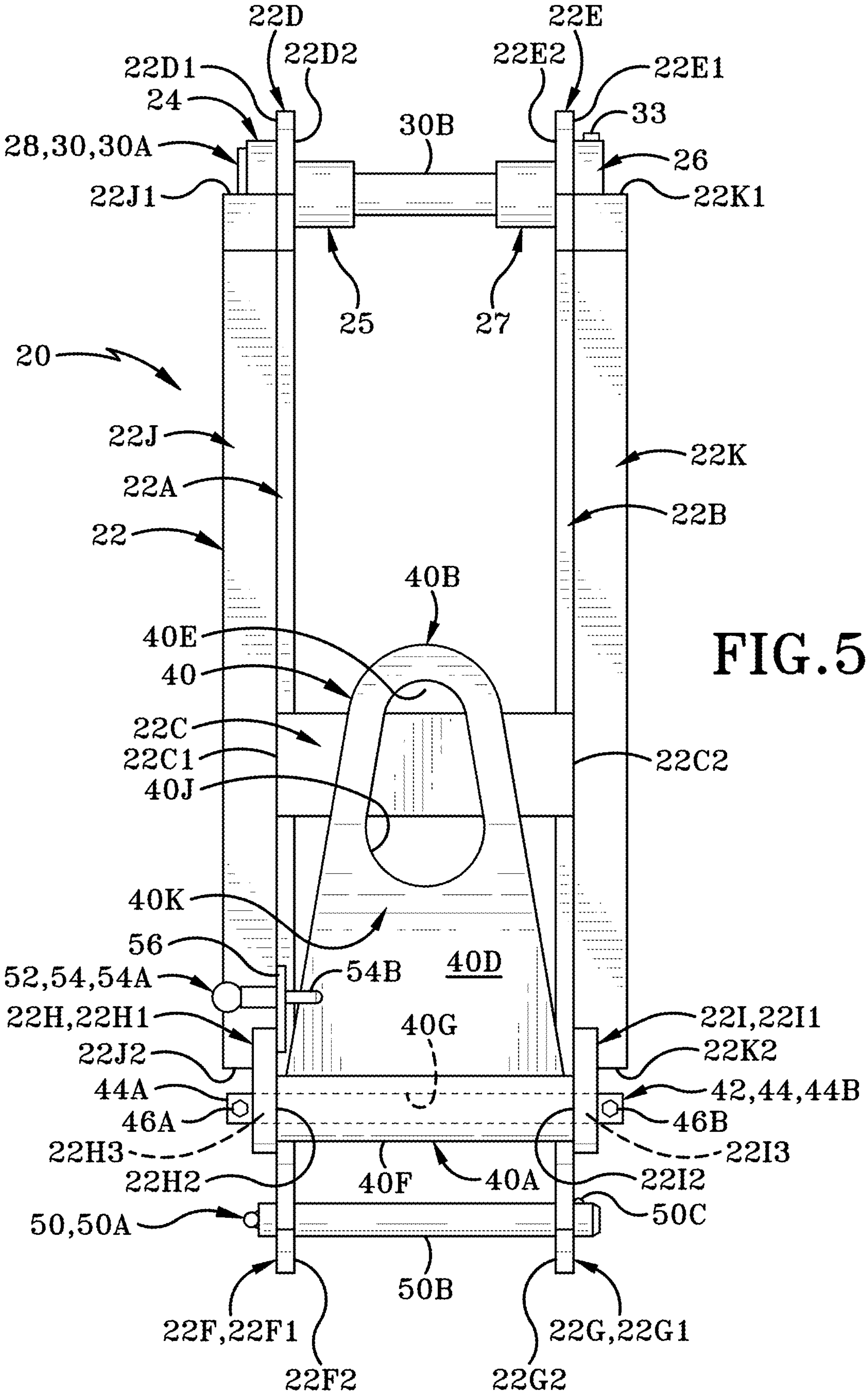
FIG. 5 is a partial front elevation view of the control arm of the preinstalled hook lift system with the assembly.

Referring to FIG. 5, the assembly 20 also includes a securement mechanism 28 that operably engages the frame 22 with the control arm 6. More particularly, the securement mechanism 28 rotatably engages the frame 22 with the control arm 6 at the first position on the control arm 6.

Still referring to FIG. 5, the securement mechanism 28 includes a securement pin 30 that operably engages the frame 22 with the control arm 6. The securement pin 30 includes a head 30A, a shaft 30B that extends away from the head 30A, and a longitudinal axis 30C that extends between the head 30A and a distal end of the shaft 30B. Upon assembly, the shaft 30B of the securement pin 30 is configured to be received by the first mounting plate 22D, via the first opening 22D3, by the through-hole 6E of the control arm 6, and by the through-hole 8B of the hook member 8 to operably engage the first mounting plate 22D with the control arm 6. Similarly, upon assembly, the shaft 30B of the securement pin 30 is also configured to be received by the second mounting plate 22E, via the second opening 22E3, by the through-hole 6E of the control arm 6, and by the through-hole 8B of the hook member 8 to operably engage the second mounting plate 22E with the control arm 6. The securement pin 30 also defines a passage 30D at a distal end of the securement pin 30 away from the head 30A (see FIG. 6). The passage 30D extends entirely through the securement pin 30 along an axis that is orthogonal to the longitudinal axis of the securement pin 30. Such use of the passage 30D defined by the securement pin 30 is described in more detail below.

During operation, the frame 22 is rotatably engaged with the securement pin 30 where the frame 22 is circumferentially rotatable about the longitudinal axis 30C of the securement pin 30. Such rotation of the frame 22 about the longitudinal axis 30C of the securement pin 30 during loading and unloading operations is described in more detail below. While not illustrated herein, the securement pin 30 also enables the hook member 8 to be rotatable about the longitudinal axis 30C of the securement pin 30 for using the first hook 8A or the second hook during loading and unloading operations.

Still referring to FIG. 5, the securement mechanism 28 includes a collar 32 that operably engages with the securement pin 30. More particularly, the collar 32 of the securement mechanism 28 is configured to be releasably engaged with a portion of the shaft 30B proximate to the second mounting plate 22E. As such, the collar 32 maintains the position of the securement pin 30 with the control arm 6, the hook member 8, and the frame 22 while still allowing rotation of both the hook member 8 and the frame 22 during operation. In other exemplary embodiments, any suitable device and/or component may be used to maintain a securement pin with a control arm, a hook member, and a frame while still allowing rotation of each of the hook member and the frame.

Referring to FIG. 6, the collar 32 defines first and second through-holes 32A, 32B that are coaxial with one another. Upon assembly, the first and second through-holes 32A, 32B are coaxial with the passage 30D of the securement pin 30. The first and second through-holes 32A, 32B are configured to receive a fastener 33 (see FIG. 3) or a similar component to operably engage the collar 32 with the securement pin 30 via the passage 30D and the first and second through-holes 32A, 32B. Additionally, the collar 32 defines a passageway 32C that extends entirely through the collar 32 where the passageway 32C is in fluid communication with the first and second through-holes 32A, 32B. The passageway 32C is sized and configured to receive and house a portion of the shaft 30B of the securement pin 30 to enable the securement pin 30 and the collar 32 to operably engage with one another.

While not illustrated herein, an attachment mechanism 33 operably engages the second outer tubular member 26, the securement pin 30 and the collar 32 to operably engage with one another. As such, the attachment mechanism 33 may include a fastener or similar component of the like may be passed through holes (not illustrated) defined in the second outer tubular member 26, the passage 30D defined in the securement pin 30, and the first and second through-holes 32A, 32B defined in the collar 32 to operably engage the securement pin 30 and the collar 32 to operably engage with one another. The fastener of the attachment mechanism 33 may then be operably engaged with a nut or similar component of the like to maintain the fastener with the securement pin 30 and the collar 32.

The assembly 20 also includes a tow ring 40 that operably engages with the frame 22. More particularly, the tow ring 40 rotatably engages with the frame 22 in that the tow ring 40 rotates along the frame 22; such rotation of the tow ring 40 during operation is described in more detail below. The tow ring 40 of the assembly 20 is configured to operably engage with a hook provided on a cable-specific roll-off dumpster and/or waste container (see FIG. 8); such engagement between the tow ring 40 and the cable-specific roll-off dumpster during operation is also described in more detail below.

Such inclusion of the tow ring 40 of the assembly 20 with the conventional hook lift system 2 is considered advantageous at least because operators of these dumpster translation systems are enabled to load and unload cable-specific roll-off dumpsters with the assembly 20 or a hook-specific roll-off dumpsters with the preinstalled hook lift system 2. As such, operators of these systems are enabled to use a single vehicle (like vehicle 1) for loading and unloading both cable-specific roll-off dumpsters and hook-specific roll-off dumpsters as compared to conventional techniques of using a first vehicle that is only equipped with a specific hook lift system (like hook lift system 2) for loading and unloading hook-specific roll-off dumpster and another vehicle that is only equipped with a specific cable lift system for loading and unloading cable-specific roll-off dumpsters.

Figure 8:
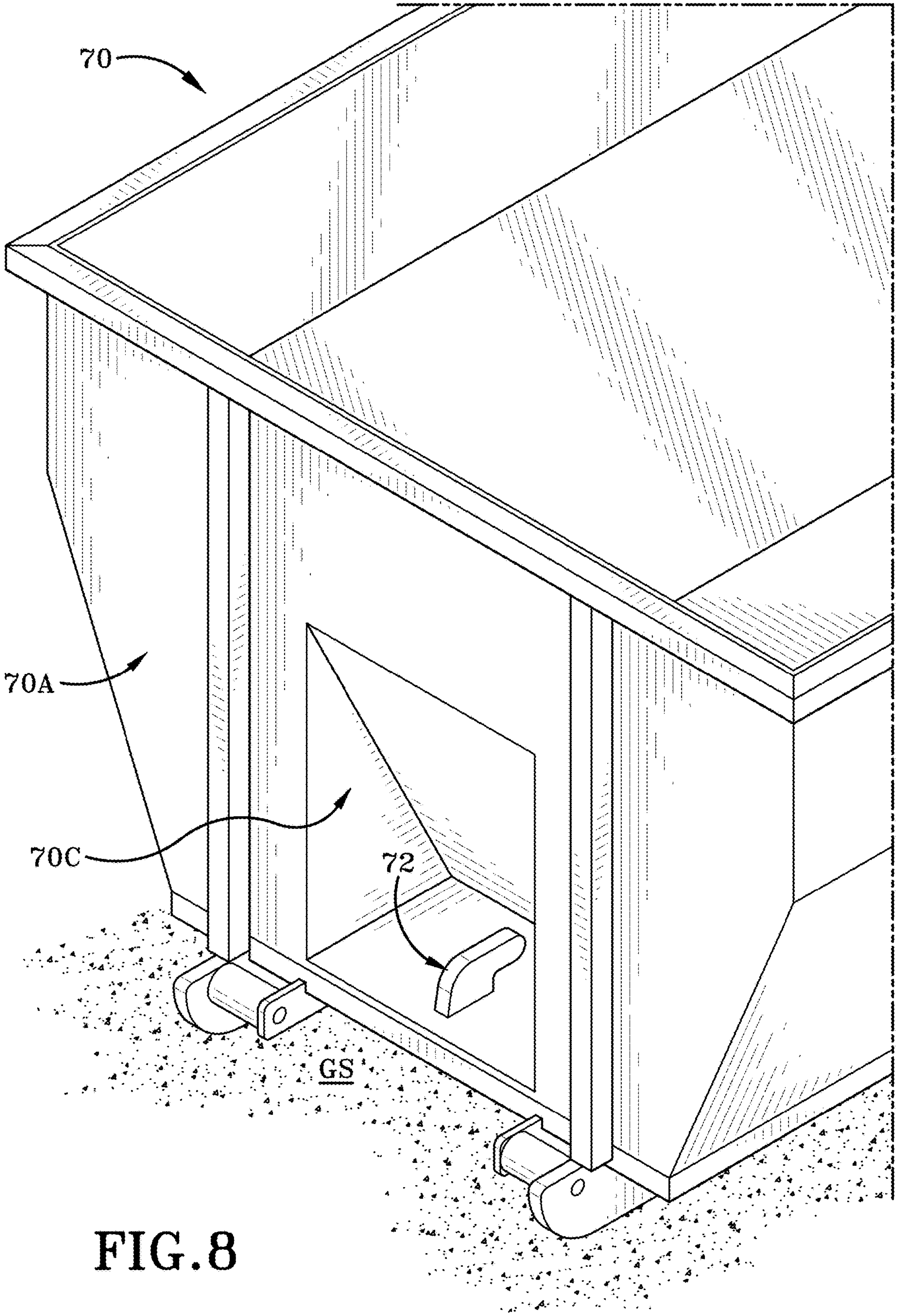
FIG. 8 is a partial front, top, left isometric perspective view of a cable-specific roll-off dumpster.

As illustrated herein, the illustrated tow ring 40 defines a D-shaped configuration that is configured to operably engage with a hook provided on a cable-specific roll-off dumpster and/or waste container (see FIG. 8). It will be understood that the illustrated tow ring 40 defining a D-shaped configuration may have any suitable shape, size, and configuration that is configured to operably engage with a hook provided on a cable-specific roll-off dumpster and/or waste container. As such, illustrated tow ring 40 may define any suitable shape besides a rounded and/or curvilinear shape.

Referring to FIG. 6, the tow ring 40 includes a first or front end 40A operably engaged with the frame 22, a second or rear end 40B opposite to the first end 40A and free from engagement with the frame 22, and a longitudinal axis defined therebetween. The tow ring 40 also includes an interior surface 40C that extends between the first end 40A and the second end 40B. The tow ring 40 also includes an exterior surface 40D that extends between the first end 40A and the second end 40B and that opposes the interior surface 40C.

Still referring to FIG. 6, the tow ring 40 defines a through-hole 40E between the first end 40A and the second end 40B proximate to and/or closer to the second end 40B. The through-hole 40E defined by the tow ring 40 also extends entirely through the tow ring 40 along an axis orthogonal to the longitudinal axis of the tow ring 40. The interior surface 40C and the exterior surface 40D are also in fluid communication with one another by the through-hole 40E. As described in more detail below, the through-hole 40E defined by the tow ring 40 is sized and configured to receive a hook of a cable-specific roll-off dumpster to enable the tow ring 40 to operably engaged with the hook to translate the cable-specific roll-off dumpster from the ground surface to the flatbed 1C of the vehicle 1.

Still referring to FIG. 6, the tow ring 40 includes a tubular member 40F provided at the first end 40A of the tow ring 40. The tubular member 40F extends along an axis that is orthogonal to the longitudinal axis of the tow ring 40. The tow ring 40 also defines a passageway 40G inside of the tubular member 40F that extends along the same axis of the tubular member 40F that is orthogonal to the longitudinal axis of the tow ring 40. Upon assembly with the frame 22, the tubular member 40F is adjacent to each of the first extension 22H and the second extension 22I of the frame 22. Upon assembly with the frame 22, the passageway 40G defined in the tubular member 40F is also aligned and coaxial with the first hole 22H3 defined by the first extension 22H and the second hole 22I3 of the second extension 22I.

Still referring to FIG. 6, the tow ring 40 also includes at least one guide that is positioned proximate to the through-hole 40E and that extends from one or both of the interior surface 40C and the exterior surface 40D. In the illustrated embodiment, the tow ring 40 has a first guide 40H that is positioned at a first location on the interior surface 40C. The tow ring 40 also has a second guide 40I that is positioned at a second location on the interior surface 40C opposite to the first guide 40H. Each of the first guide 40H and the second guide 40I also extends upwardly away from the interior surface 40C. The first guide 40H and the second guide 40I are configured to guide and maintain a hook of a cable-specific roll-off dumpster through the tow ring 40, via the through-hole 40E, when loading the cable-specific roll-off dumpster from a ground surface to the flatbed 1C of the vehicle 1.

Still referring to FIG. 6, the tow ring 40 also includes an interior wall 40J that defines the through-hole 40E; such use of the interior wall 40J during loading and unloading operations is described in more detail below. Still referring to FIG. 6, the tow ring 40 may also include a bend 40K that is defined at a position between the first end 40A and the second end 40B of the tow ring 40; such use of the bend 40K during loading and unloading operations is described in more detail below.

The assembly 20 also includes a locking mechanism 42 that rotatably engages the tow ring 40 with the frame 22. More particularly, the locking mechanism 42 operably engages the tubular member 40F of the tow ring 40 with the first extension 22H and the second extension 22I. Such engagement between the tow ring 40 and the frame 22 via the locking mechanism 42 enables the tow ring 40 to rotate and/or hinge at the first end 40A between a retracted position (see FIGS. 1-3, 5, and 6) and a released position (see FIGS. 7 and 10-15).

Referring to FIG. 2-5, the locking mechanism 42 includes a locking pin 44 that operably engages the tow ring 40 with the frame 22. In the illustrated embodiment, the locking pin 44 includes a first end 44A, a second end 44B that opposes the first end 44A, and a longitudinal axis 44C defined therebetween. During assembly, the locking pin 44 is received by the first hole 22H3 defined by the first extension 22H, a second hole 22I3 defined by the second extension 22I, and a passageway 40G defined by the tubular member 40F of the tow ring 40 to operably engage the frame 22 and the tow ring 40 with one another. Upon assembly, the first end 44A of the locking pin 44 is disposed proximate to the first extension 22H at a distance away from the outer surface 22H1. The second end 44B of the locking pin 44 is also disposed proximate to the second extension 22I at a distance away from the outer surface 22I1.

Figure 4:
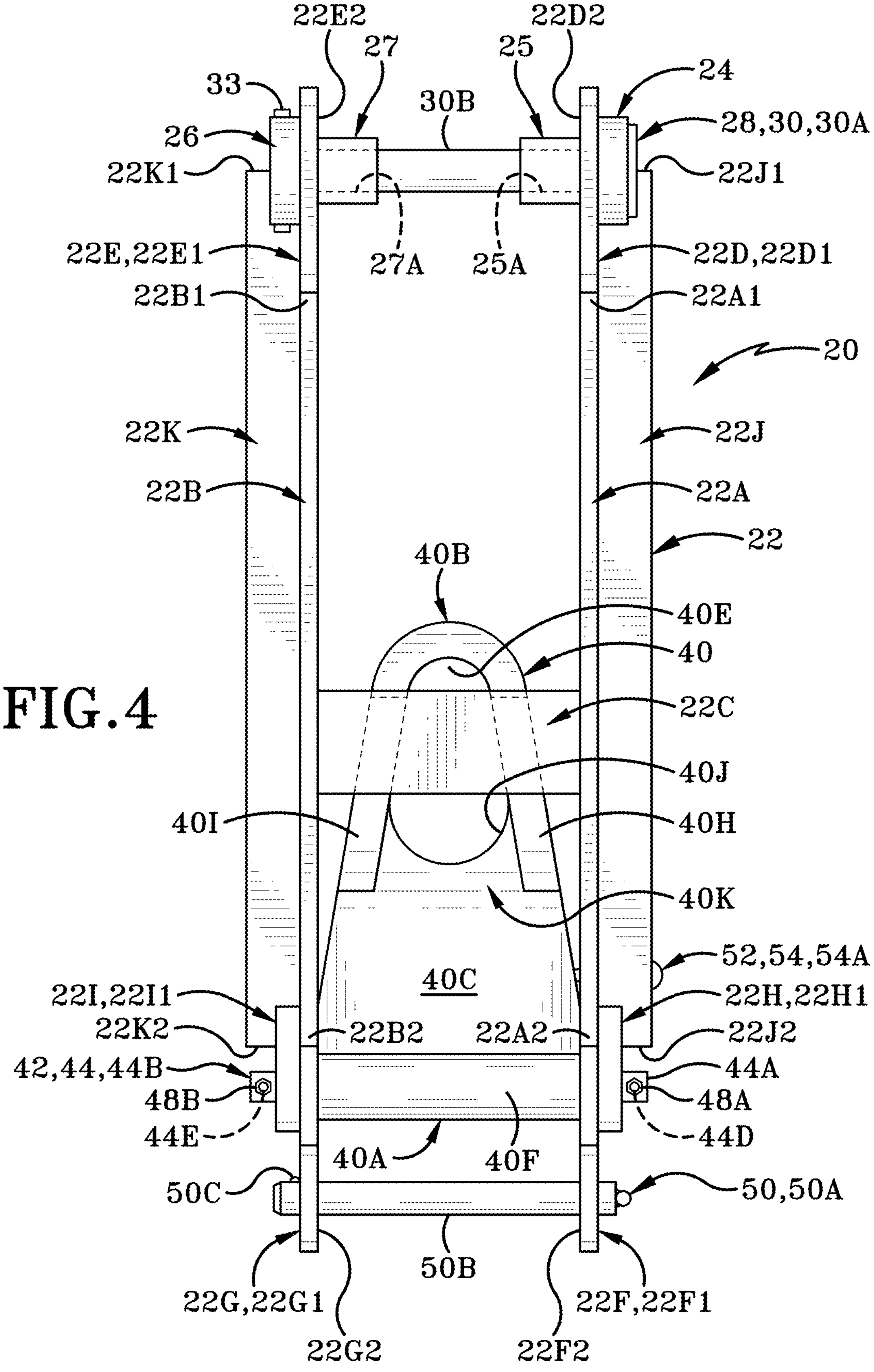
FIG. 4 is a partial rear elevation view of the control arm of the preinstalled hook lift system with the assembly.

Referring to FIGS. 4 and 6, the locking pin 44 also defines at least one passage that extends entirely through the locking pin 44 along an axis that is orthogonal to the longitudinal axis 44C of the locking pin 44. In the illustrated embodiment, the locking pin 44 defines a first passage 44D proximate to the first end 44A. The first passage 44D extends entirely through the locking pin 44 along an axis that is orthogonal to the longitudinal axis 44C of the locking pin 44. As illustrated herein, the first passage 44D is positioned away from the frame 22 proximate to the outer surface 22H1 of the first extension 22H. The locking pin 44 also defines a second passage 44E proximate to the second end 44B. The second passage 44E also extends entirely through the locking pin 44 along an axis that is orthogonal to the longitudinal axis 44C of the locking pin 44. As illustrated herein, the second passage 44E is positioned away from the frame 22 proximate to the outer surface 22I1 of the second extension 22I.

Referring to FIGS. 4, 5, and 6, the locking mechanism 46 includes at least one bolt that operably engages with the locking pin 44, via one the at least one passage, and threadably engages with at least one nut to maintain the locking pin 44 with the frame 22 and the tow ring 40. In the illustrated embodiment, the locking mechanism includes a first bolt 46A that operably engages with the locking pin 44, via the first passage 44D, and threadably engages with a first nut 48A to maintain the locking pin 44 with the frame 22 and the tow ring 40 at the first end 44A. The locking mechanism also includes a second bolt 46B that operably engages with the locking pin 44, via the second passage 44E, and threadably engages with a second nut 48B to maintain the locking pin 44 with the frame 22 and the tow ring 40 at the second end 44B. While locking mechanism 42 includes bolts 46A, 46B threadably engaging with nuts 48A, 48B to maintain the locking pin 44 with the frame 22 and the tow ring 40, any suitable devices and/or components may be used to maintain the locking pin 44 with the frame 22 and the tow ring 40.

The assembly 20 also includes a retaining pin 50 that selectively fixes the frame 22 with the control arm 6 of the hook lift system 2. During operation, the retaining pin 50 maintains the frame 22 in the locked position when the retaining pin 50 is operably engaged with the control arm 6 and the frame 22 (see FIGS. 1-5). The retaining pin 50 unlocks the frame 22 in the unlocked position when the retaining pin 50 is operably disengaged and removed from the control arm 6 and the frame 22 (see FIG. 9).

Figure 2:
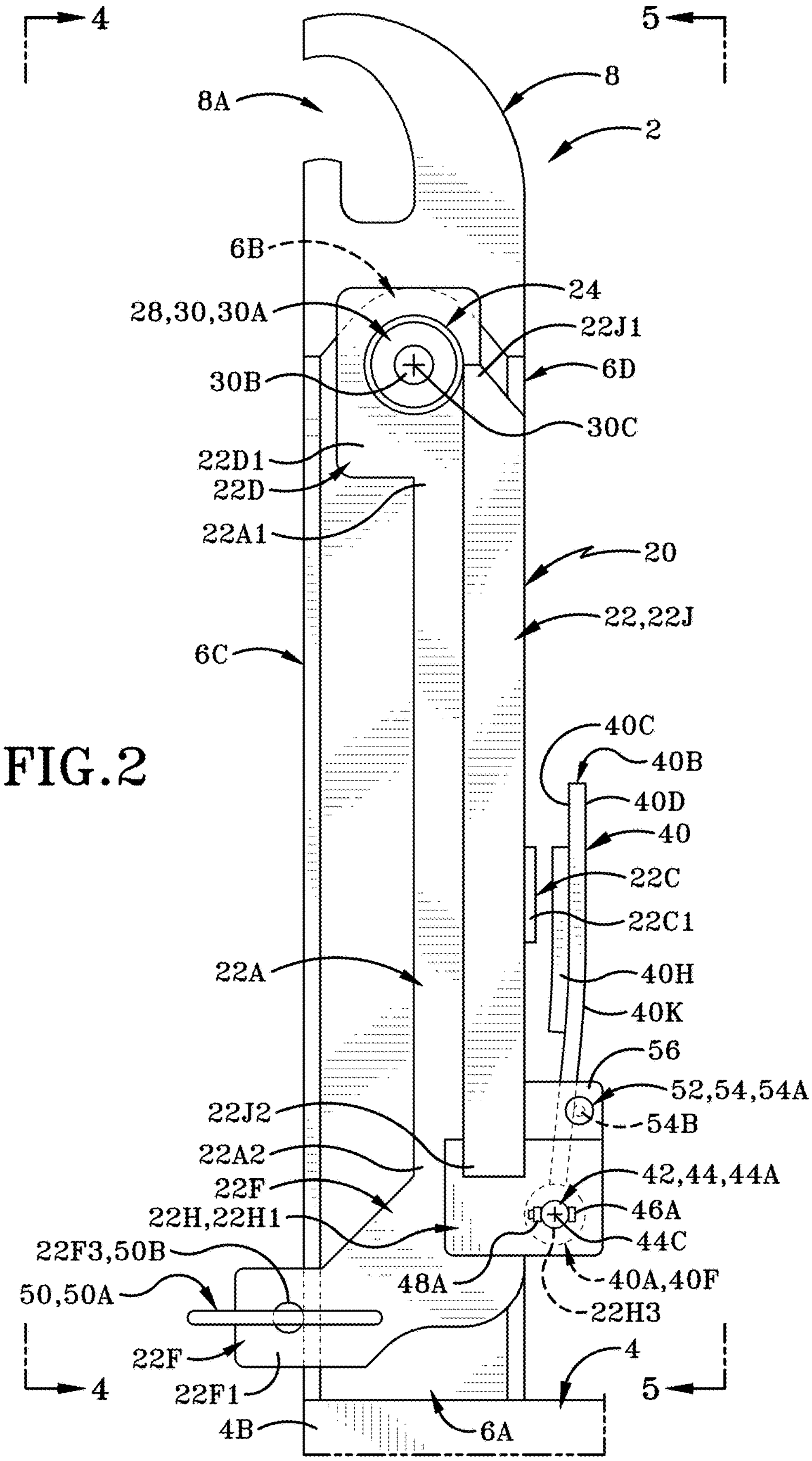
FIG. 2 is an enlargement view of the highlighted region shown in FIG. 1.
Figure 3:
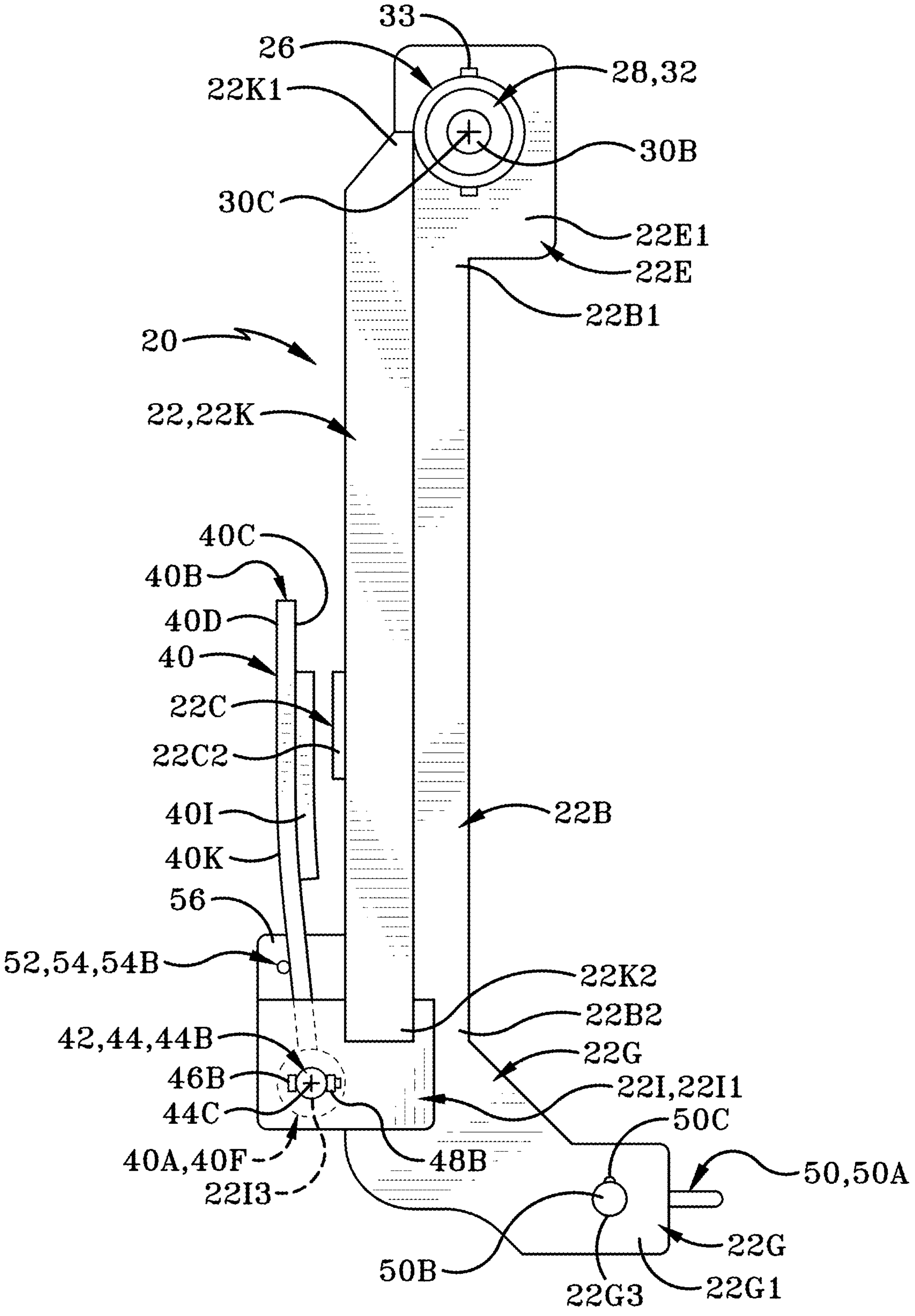
FIG. 3 is a partial right side elevation view of a control arm of the preinstalled hook lift system with the assembly.

Referring to FIG. 6, the retaining pin 50 includes a handle 50A, a shaft 50B that extends away from the shaft 50B, and a longitudinal axis defined along the shaft 50B. As illustrated in FIGS. 2 and 3, the shaft 50B operably engages with the first bracket 22F via the first aperture 22F3, the second bracket 22G via the second aperture 22G3, and the front end 6C of the control arm 6. During operation, the retaining pin 50 directly abuts and braces against the front end 6C of the control arm 6 when the operator desires to maintain the frame 22 in the locked position. In one instance, the operator may desire to lock the frame 22 in the locked position, via the retaining pin 50, when the vehicle 1 is traveling between loading and unloading locations. In another instance, the operator may desire to lock the frame 22 in the locked position, via the retaining pin 50, when the vehicle 1 is traveling with a roll-off dumpster loaded on the vehicle 1 to prevent longitudinally movement and/or shifting of said roll-off dumpster.

The retaining pin 50 may also include a biasing button 50C that operably engages with the shaft 50B of the retaining pin 50. As such, the biasing button 50C is moveable along an axis that is orthogonal to the longitudinal axis of the shaft 50B between a raised position and a lowered position. In the raised position, the biasing button 50C extends outwardly from the shaft 50B where a portion of the biasing button 50C is positioned outside of the shaft 50B (see FIG. 3). In the lowered position, the biasing button 50C extends downwardly into the shaft 50B where the biasing button 50C is positioned inside of the shaft 50B.

During operation, the biasing button 50C may move between the raised position and the lower position as the operator inserts and/or removes the retaining pin 50 from the frame 22. As such, the biasing button 50C may move between the raised position and the lower position as the biasing button 50C interacts with the frame 22, specifically the first bracket 22F and the second bracket 22G. As illustrated in FIG. 3, the biasing button 50C operably engages with the outer surface 22G1 of the second bracket 22G in the raised position to maintain the retaining pin 50 with the frame 22 and the control arm 6. Such operation of the retaining pin 50 is described in more detail below.

In other exemplary embodiments, any suitable device may be used for retaining a retaining pin with a frame and a control arm of a hook lift system. In other exemplary embodiments, a retaining pin described herein may remain attached with a frame described herein while still allowing the frame to pivot on a control arm described herein and rotate about a securement mechanism described herein. In one exemplary embodiment, a retaining pin may be biased and/or spring-loaded to allow the retaining pin for retaining and releasing a frame while being attached with the frame.

The assembly 20 also includes at least one latching mechanism 52 operably engaged with the frame 22 and selectively engaged with the tow ring 40. In the illustrated embodiment, the assembly 20 includes a single latching mechanism 52 operably engaged with the frame 22 and selectively engaged with the tow ring 40 upon selection by the operator. The latching mechanism 52 is configured to selectively maintain the tow ring 40 between the retracted position (FIGS. 1-5) proximate to the frame 22 and the released position (FIG. 7) rotated away from the frame 22 as selected by the operator. In the retracted position, the latching mechanism 52 is configured to selectively maintain the tow ring 40 in the retracted position proximate to the frame 22. In the released position, the latching mechanism 52 is configured to allow the tow ring 40 to rotate away and towards the frame 22.

Figure 7:
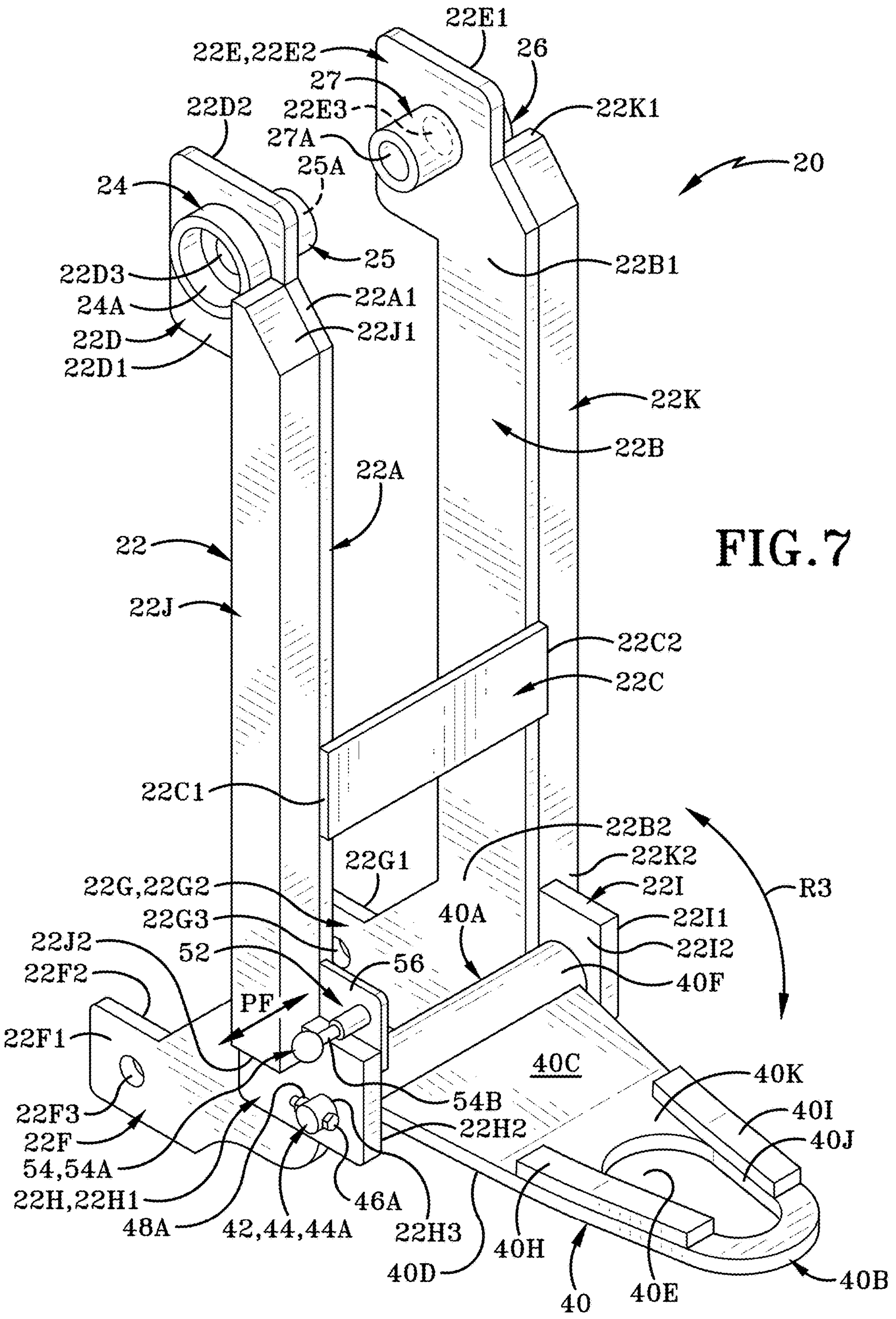
FIG. 7 is an isometric perspective view of the assembly, wherein the tow ring of the assembly is provided in a released position relative to the frame of the assembly.

Referring to FIGS. 6 and 7, the latching mechanism 52 includes a peg 54 that is moveable between a latched position (see FIG. 6) and a drawn-back position (FIG. 7) for selectively engaging with the tow ring 40. The peg 54 includes a handle 54A, a shaft 54B that extends away from the handle 54A, and a longitudinal axis defined along the shaft 54B. Such operation of the peg 54 is described in more detail below.

The latching mechanism 52 also includes a housing 56 that operably engages with the frame 22. More particularly, the housing 56 operably engages with the first extension 22H of the frame 22 along the inner surface 22H2 of the first extension 22H. The housing 56 is sized and configured to hold and maintain the peg 54. During operation, a portion of the shaft 54B of the peg 54 may be disposed exterior to the housing 56 in the latched position to maintain the tow ring 40 at the retracted position. In the latched position, a portion of the shaft 54B operably engages with the exterior surface 40D of the tow ring 40 to maintain the tow ring 40 at the retracted position. In the latched position, the handle 54A is also positioned adjacent to the housing 56. Also during operation, the shaft 54B of the peg 54 may be disposed inside of the housing 56 in the retracted position to enable the tow ring 40 to move and rotate relative to the frame 22. In the retracted position, a distal end of the shaft 54B is positioned inside of the housing 56 or positioned away from the tow ring 40 to enable the tow ring 40 to move and rotate relative to the frame 22. In the retracted position, the handle 54A is also positioned at a distance away from the housing 56.

The latching mechanism 52 may also include a biaser (not illustrated) that operably engages with the peg 54 and is housed inside of the housing 56. The biaser may provide biasing means to the peg 54 to bias the peg 54 in the latched position to maintain the tow ring 40 in the retracted position. In other words, the peg 54 may be biased back to the latched position once an operator ceases a pulling force on the handle 54A when the peg 54 is provided in the retracted position.

Having now described the components and mechanisms of the assembly 20, a method of using the assembly 20 with the hook lift system 2 for translating a cable-specific roll-off dumpster between a ground surface and the vehicle 1 is described in more detail below.

As discussed above, the assembly 20 is configured to operably engaged with a hook of a cable-specific roll-off dumpster. As illustrated in FIG. 8, a cable-specific roll-off dumpster 70 is partial shown being provided on a ground surface "GS". The cable-specific roll-off dumpster 70 includes a front end 70A and a rear end 70B (see FIG. 14) opposite to the front end 70A. The cable-specific roll-off dumpster 70 defines a front cavity 70C that extends into the cable-specific roll-off dumpster 70 from the front end 70A towards the rear end. The cable-specific roll-off dumpster 70 also includes a hook 70D that is operably engaged with the cable-specific roll-off dumpster 70 inside of the front cavity 70C. As described in more detail below, the hook 70D provides a means for engaging a cable lift system to translate the cable-specific roll-off dumpster 70 between the ground surface and the vehicle 1. Here, the hook 70D provides a means for enabling the assembly 20 to operably engaging with the cable-specific roll-off dumpster 70 to translate the cable-specific roll-off dumpster 70 between the ground surface and the vehicle 1. The cable-specific roll-off dumpster 70 also includes at least one roller assembly 70E positioned at the rear end 70B of the cable-specific roll-off dumpster 70. During operation, the at least one roller assembly 70E assist in moving the cable-specific roll-off dumpster 70 between the ground surface "GS" and the vehicle 1 during loading and unloading operations.

Prior to loading the cable-specific roll-off dumpster 70, the retaining pin 50 retains the frame 22 with the control arm 6 between loading and unloading operations by the retaining pin 50. As such, the retaining pin 50 of the retaining pin 50 operably engages with the first bracket 22F and the second bracket 22G while also engaging with the front end 6C of the control arm 6. Per this arrangement, the retaining pin 50 prevents the frame 22 from pivoting past the control arm 6 and rotating about the securement pin 30 of the securement mechanism 28. The biasing button 50C of the retaining pin 50 is also provided in the raised position where the biasing button 50C operably engaged with one of the outer surface 22F1 of the first bracket 22F and the outer surface 22G1 of the second bracket 22G dependent upon the orientation of the retaining pin 50 relative to the frame 22.

Prior to arrival, the tow ring 40 is also provided in the retracted position proximate to the frame 22 between loading and unloading operation by the at least one latching mechanism 52. As such, the peg 54 is provided in the latched position and operably engages with the exterior surface 40D of the tow ring 40 to maintain the tow ring 40 in the retracted position. Such transitioning of the tow ring 40 from the retracted position to the released position via the at least one latching mechanism 52 is described in more detail below.

Figure 9:
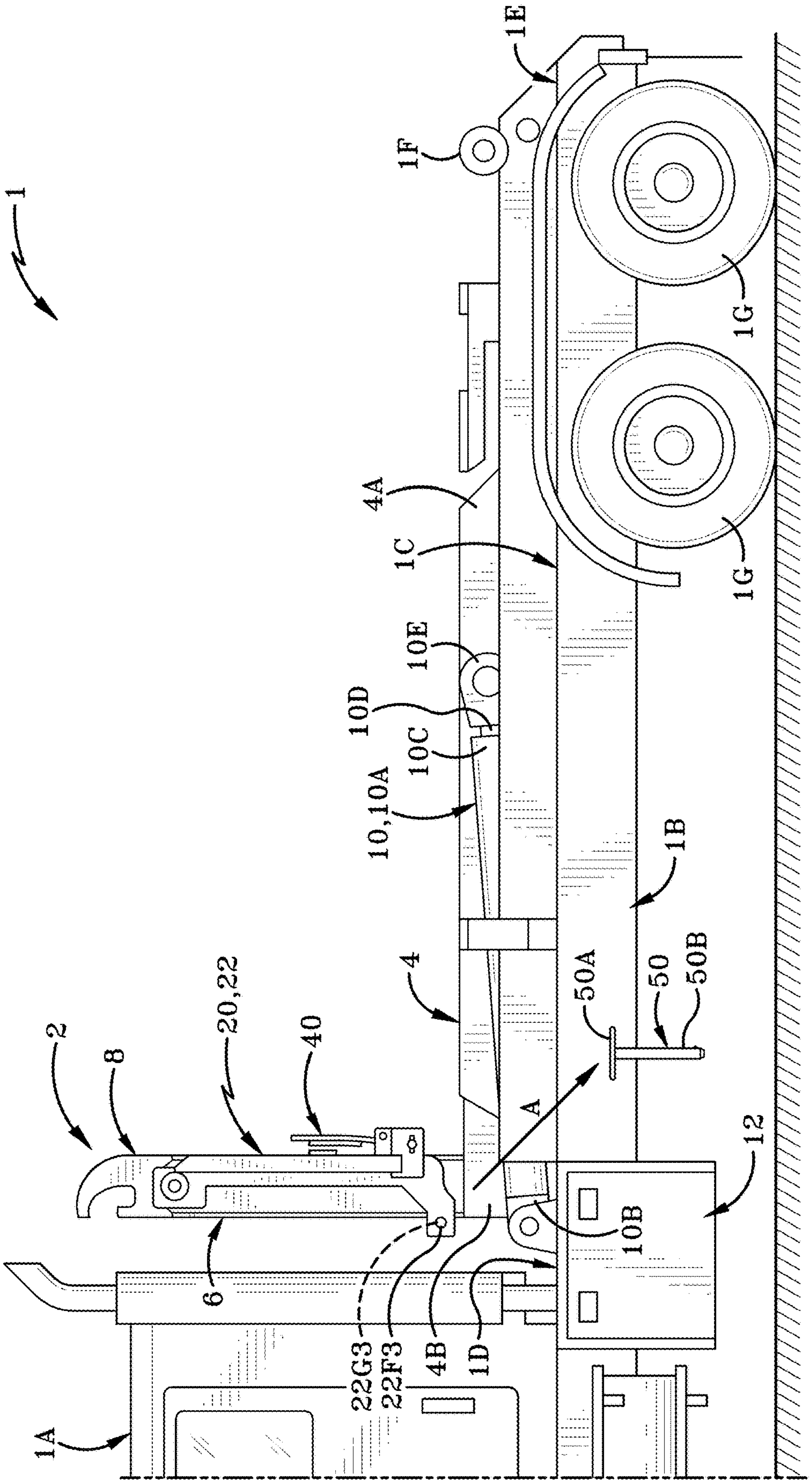
FIG. 9 is an operational view of the preinstalled hook lift system with the assembly, wherein a retaining pin of the assembly is removed from the frame.

As illustrated in FIG. 9, the vehicle 1 has arrived at the location of the cable-specific roll-off dumpster 70. At this point, the operator of the vehicle 1 removes and/or disengages the retaining pin 50 from the frame 22 by applying a pulling force on the retaining pin 50 away from the frame 22. Such removal of the retaining pin 50 via a pulling force is denoted by an arrow labeled "A" in FIG. 9. Once removed, the retaining pin 50 may be placed at a location remote from the frame 22 and enable the frame 22 to pivot from the control arm 6 and rotate about the securement mechanism 28. In other exemplary embodiments, a retaining pin may remain with a frame while still allowing the frame to be pivoted and rotated during operation (as described above). At this point, the frame 22 is enabled to pivot from the control arm 6 and to rotate about the longitudinal axis 30C of the securement pin 30.

Once the retaining pin 50 is disengaged from the frame 22 and the control arm 6, the operator may then actuate the hook lift system 2 and the assembly 20 towards the cable-specific roll-off dumpster 70. As illustrated in FIG. 10, the operator provides a first input on the power mechanism 12 to actuate the base arm 4, the control arm 6, and the assembly 20 towards the cable-specific roll-off dumpster 70 relative to the vehicle 1. Upon this first input, the power mechanism 12 applies a first linear force on the at least one actuator 10 to actuate the piston rod 10D towards the rear end 1E of the flatbed 1C. Such first linear force applied by the power mechanism 12 on the piston rod 10D is denoted by an arrow labeled "LF1" in FIGS. 10-11. Upon this first linear force, the base arm 4, the control arm 6, and the assembly 20 are collectively rotated from the flatbed 1C and towards the cable-specific roll-off dumpster 70. Such collective rotation of the base arm 4, the control arm 6, and the assembly 20 is denoted by an arrow labeled "R1" in FIGS. 10-11. The first linear force applied by the power mechanism 12 on the piston rod 10D may also continue until the operator desires to end the first input on the power mechanism 12 (e.g., when the assembly 20 is proximate to the hook 70D of the cable-specific roll-off dumpster 70.

As the base arm 4 and the control arm 6 rotate towards the rear end 1E of the flatbed 1C, the frame 22 and the tow ring 40 collectively pivot on the control arm 6 via the securement mechanism 28. As shown in FIG. 10, the frame 22 rotates circumferentially about the securement pin 30. More particularly, the first mounting plate 22D and the second mounting plate 22E rotate circumferentially about the longitudinal axis 30C of the securement pin 30 of the securement mechanism 28. During this rotation, the tow ring 40 also rotates with the frame 22. Such collective rotation of the frame 22 and the tow ring 40 relative to the control arm 6 is denoted by an arrow labeled "R2" in FIG. 10. As such, the collective rotation of the frame 22 and the tow ring 40 is enabled upon the rotation of the base arm 4 and the control arm 6 applied by the at least one actuator 10.

Referring to FIG. 11, the base arm 4 is actuated by the power mechanism 12 until the assembly 20 is proximate to the cable-specific roll-off dumpster 70. More particularly, the base arm 4 is actuated by the power mechanism 12 until the operator determines that the tow ring 40 is able to operably engage with the hook 70D of the cable-specific roll-off dumpster 70. Once the tow ring 40 is proximate to the hook 70D, the operator may rotate the tow ring 40 from the retracted position (see FIGS. 9-10) to the released position (see FIGS. 11-15) via the at least one latching mechanism 52. As such, the operator applies a pulling force on the handle 54A of the peg 54 to move the peg 54 from the latched position (see FIG. 6) to the retracted position (see FIG. 7). Such pulling force applied on the handle 54A of the peg 54 is denoted by a double arrow labeled "PF" in FIG. 7. Once the peg 54 is provided in the retracted position, the peg 54 is free from engaging the exterior surface 40D of the tow ring 40 to enable the operator to rotate the tow ring 40 from the retracted position to the released position via the locking mechanism 42. More particularly, the tow ring 40 rotates circumferentially about the longitudinal axis 44C of the locking pin 44 that operably engages the tow ring 40 with the frame 22. Such rotation of the tow ring 40 about the longitudinal axis 44C of the locking pin 44 is denoted by a double arrow labeled "R3" in FIG. 11.

Figure 12:
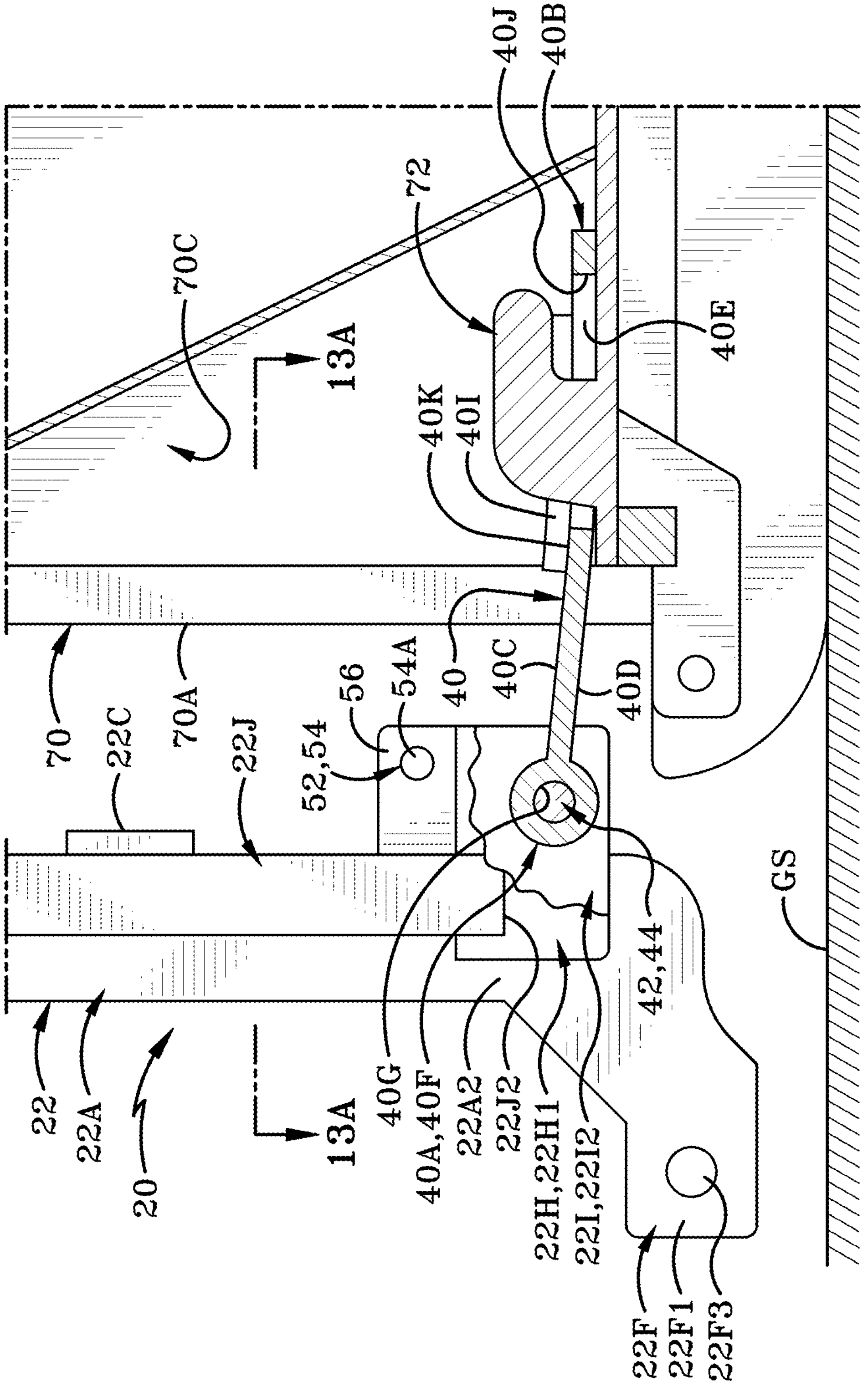
FIG. 12 is an enlargement view of the highlighted region shown in FIG. 11.
Figure 13A:
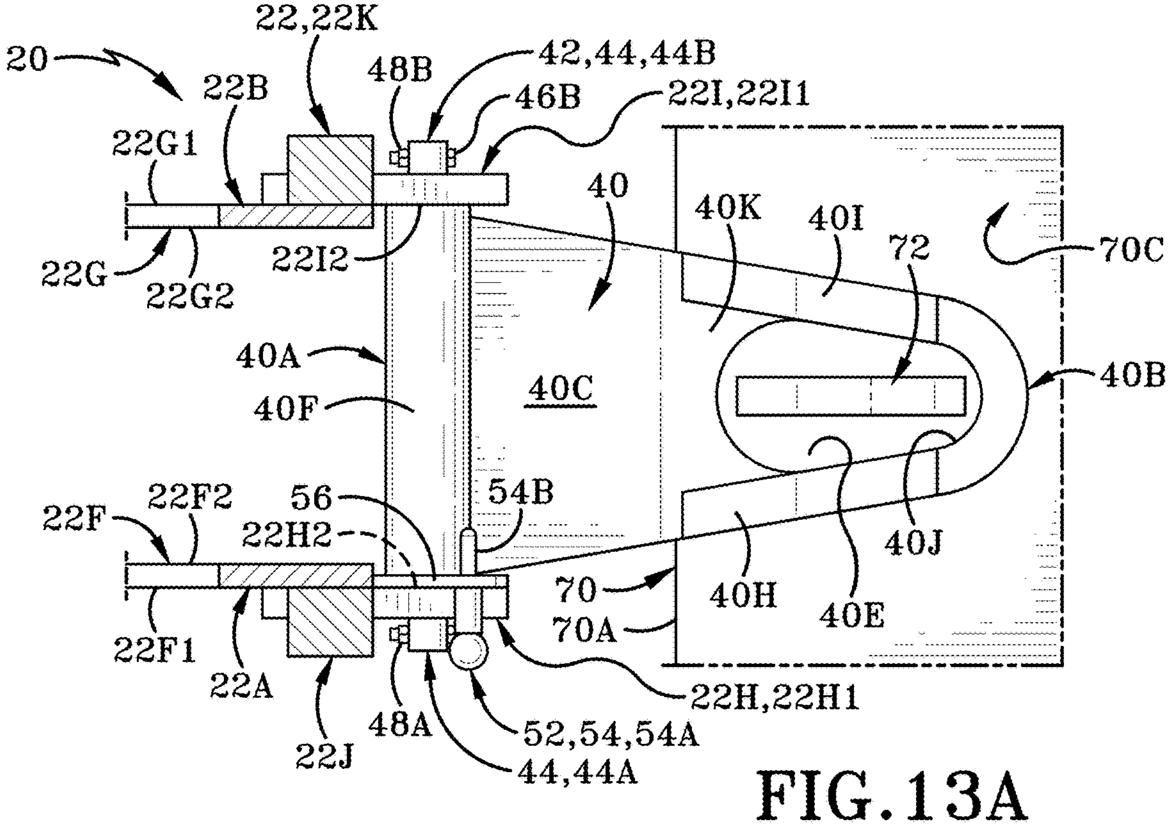
FIG. 13A is a sectional operational view taken in the direction of line 13A-13A in FIG. 12, wherein the tow ring of the assembly is provided in the released position and positioned over the hook of the cable-specific roll-off dumpster.
Figure 13B:
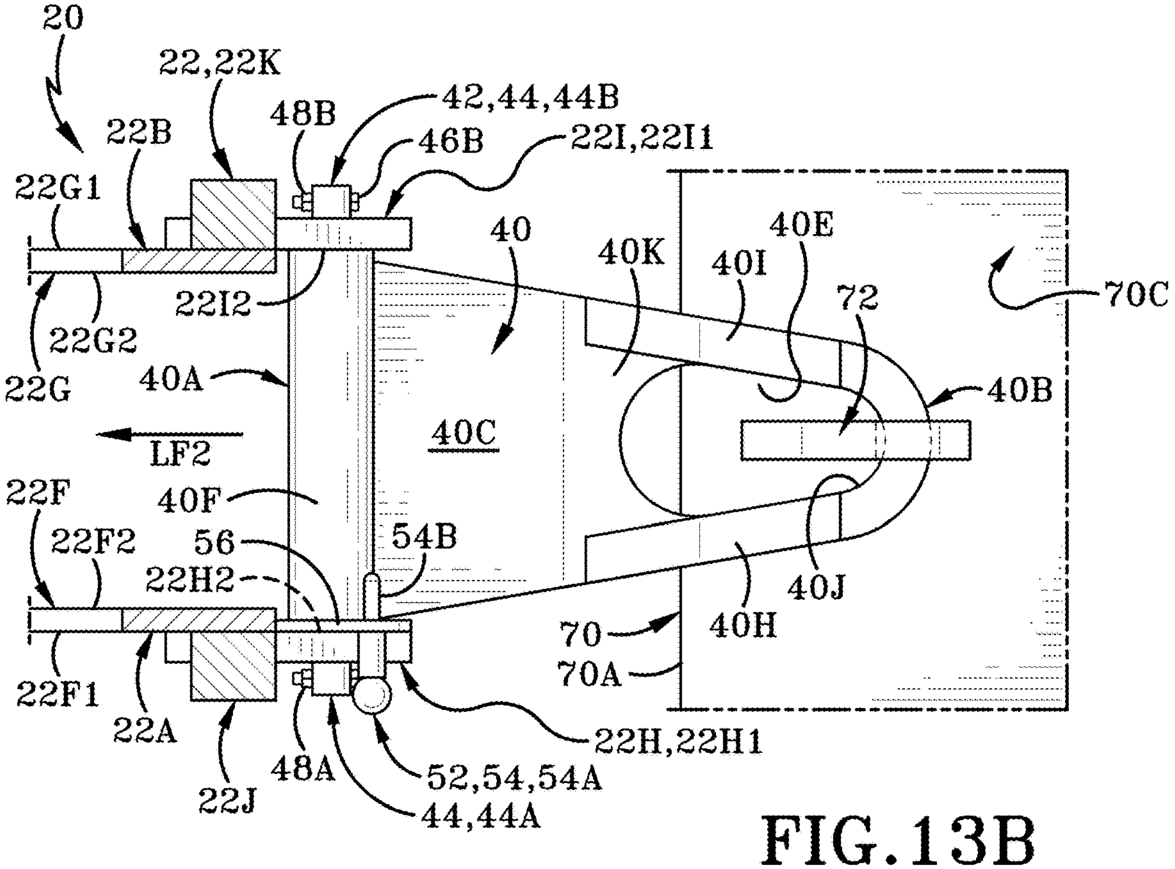
FIG. 13B is a sectional operational view in the same view as FIG. 13A, wherein the tow ring of the assembly is provided in the released position and operably engages with the hook of the cable-specific roll-off dumpster.
Figure 14:
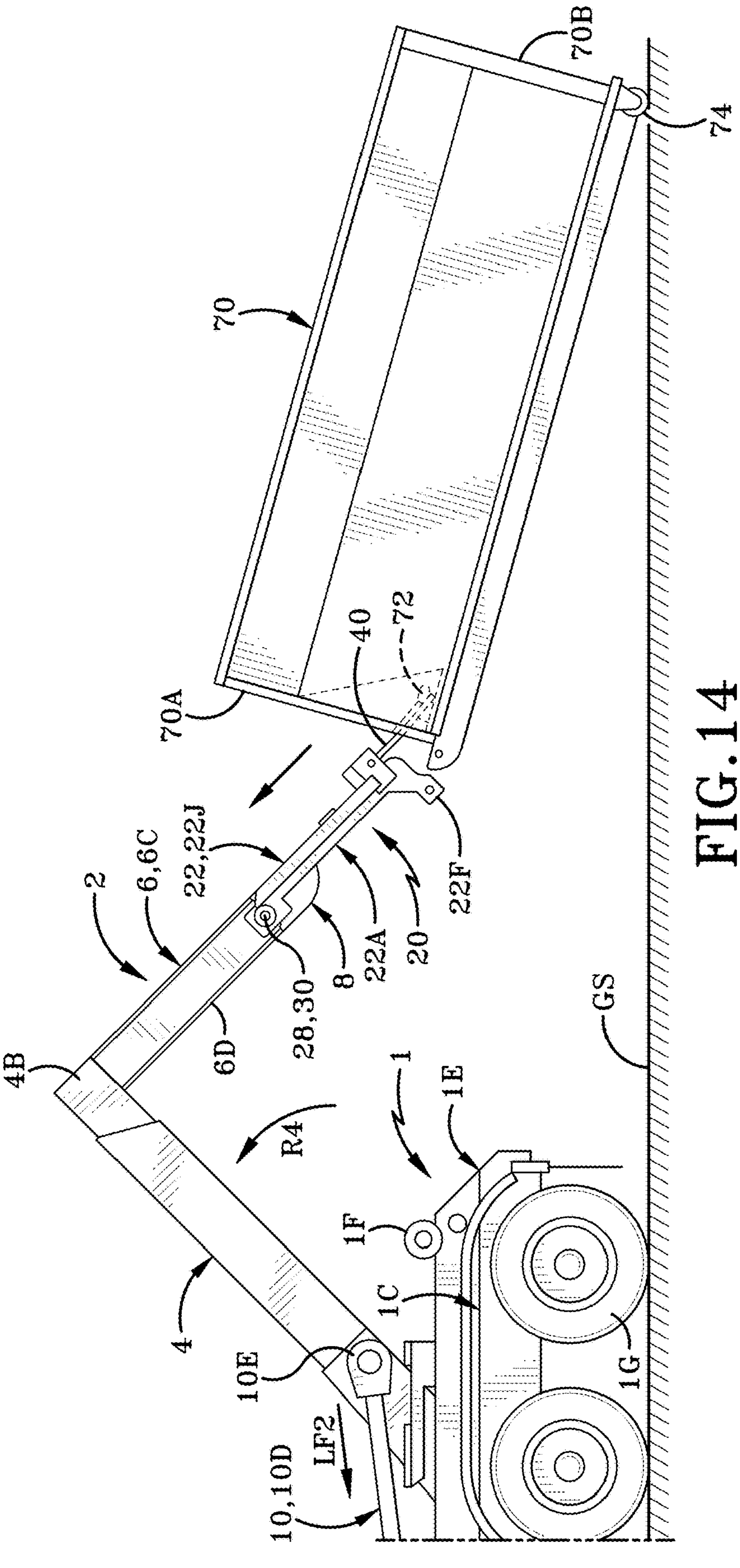
FIG. 14 is another operational view of the hook lift system with the assembly translating the cable-specific roll-off dumpster from a ground surface to the flatbed of the vehicle.
Figure 15:
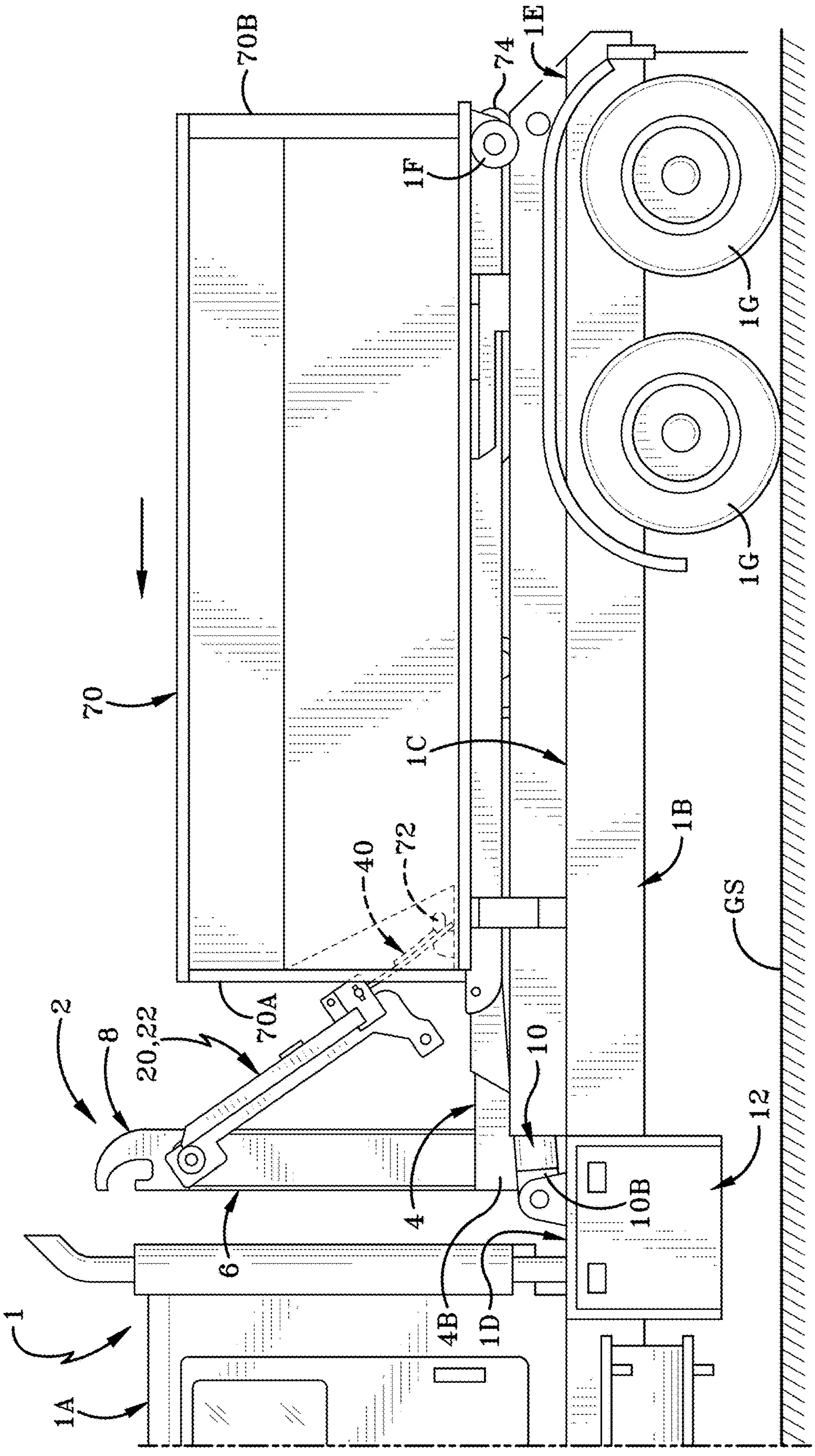
FIG. 15 is another operational view of the hook lift system with the assembly translating the cable-specific roll-off dumpster on the flatbed of the vehicle.

Once the tow ring 40 is free to rotate, the hook 70D of the cable-specific roll-off dumpster 70 is received by the through-hole 40E defined by the tow ring 40 (see FIGS. 12-13B). As shown in FIGS. 12 and 13A, the hook 70D of the cable-specific roll-off dumpster 70 is positioned inside of the through-hole 40E in that the tow ring 40 and the hook 70D are free from engaging one another. Once the hook 70D is provided inside of the tow ring 40, the operator may rest a portion of the tow ring 40 on the cable-specific roll-off dumpster 70 inside of the front cavity 70C that is defined between the second end 40B and the bend 40K.

At this point, the operator may then apply a second input on the power mechanism 12 of the hook lift system 2 to operably engage the tow ring 40 with the hook 70D of the cable-specific roll-off dumpster 70. In contrast to the first input, the second input applied by the operator on the power mechanism 12 applies an opposing linear pulling force on the base arm 4, control arm 6, and the assembly 20 towards the front end 1D of the flatbed 1C and the cab 1A of the vehicle 1. Such pulling force applied on the base arm 4, control arm 6, and the assembly 20 by the power mechanism 12 is denoted by arrow labeled "LF2" in FIGS. 13B-15. Upon this force, the interior wall 40J of the tow ring 40 operably engages with the hook 70D to enable to the hook lift system 2 and the assembly 20 to translate the cable-specific roll-off dumpster 70 from the ground surface "GS" to the flatbed 1C of the vehicle 1.

Once the tow ring 40 engages with the hook 70D, the hook lift system 2 and the assembly 20 load the cable-specific roll-off dumpster 70 on to the flatbed 1C of the vehicle 1. Upon the second input, the base arm 4, control arm 6, and the assembly 20 rotate away from the rear end 1E of the flatbed 1C and towards the front end 1D of the flatbed 1C and the cab 1A. Such collective rotation of the base arm 4, control arm 6, and the assembly 20 by the at least one actuator 10 and the power mechanism 12 is denoted by an arrow labeled "R4" in FIG. 14. During translation, the at least one roller assembly 70E provided with the cable-specific roll-off dumpster 70 assists the hook lift system 2 and the assembly 20 in loading the cable-specific roll-off dumpster 70 from the ground surface "GS" to the flatbed 1C of the vehicle 1. This pulling force applied by the power mechanism 12 may continue until the cable-specific roll-off dumpster 70 is loaded onto the flatbed 1C of the vehicle 1 (see FIG. 15).

Once the until the cable-specific roll-off dumpster 70 is loaded onto the flatbed 1C of the vehicle 1, the operator may cease the second input on the power mechanism 12. In the loaded position, the base arm 4 and the control arm 6 are provided and maintained in the initial collapsed position prior to loading the cable-specific roll-off dumpster 70. As illustrated herein, the frame 22 is rotated at a distance away from the control arm 6 when the cable-specific roll-off dumpster 70 is loaded onto the vehicle 1. More particularly, the bottom ends 22A2, 22B2 of the first upright support 22A and the second upright support 22B are positioned at a distance away from the control arm 6 when the cable-specific roll-off dumpster 70 is loaded onto the vehicle 1. As illustrated herein, the tow ring 40 is also rotated at a distance away from the frame 22 when the cable-specific roll-off dumpster 70 is loaded onto the vehicle 1. More particularly, the second end 40B of the tow ring 40 is positioned at a distance away from the frame 22 when the cable-specific roll-off dumpster 70 is loaded onto the vehicle 1.

While not illustrated herein, the hook lift system 2 and the assembly 20 are configured to unload the cable-specific roll-off dumpster 70 from the vehicle 1 to the ground surface "GS" is same steps and/or techniques as described above when a first input is applied on the power mechanism 12. While not illustrated herein, the assembly 20 may not be used when hook-specific roll-off dumpsters are being loaded and unloaded by the hook member 8 of the hook lift system 2.

Figure 16:
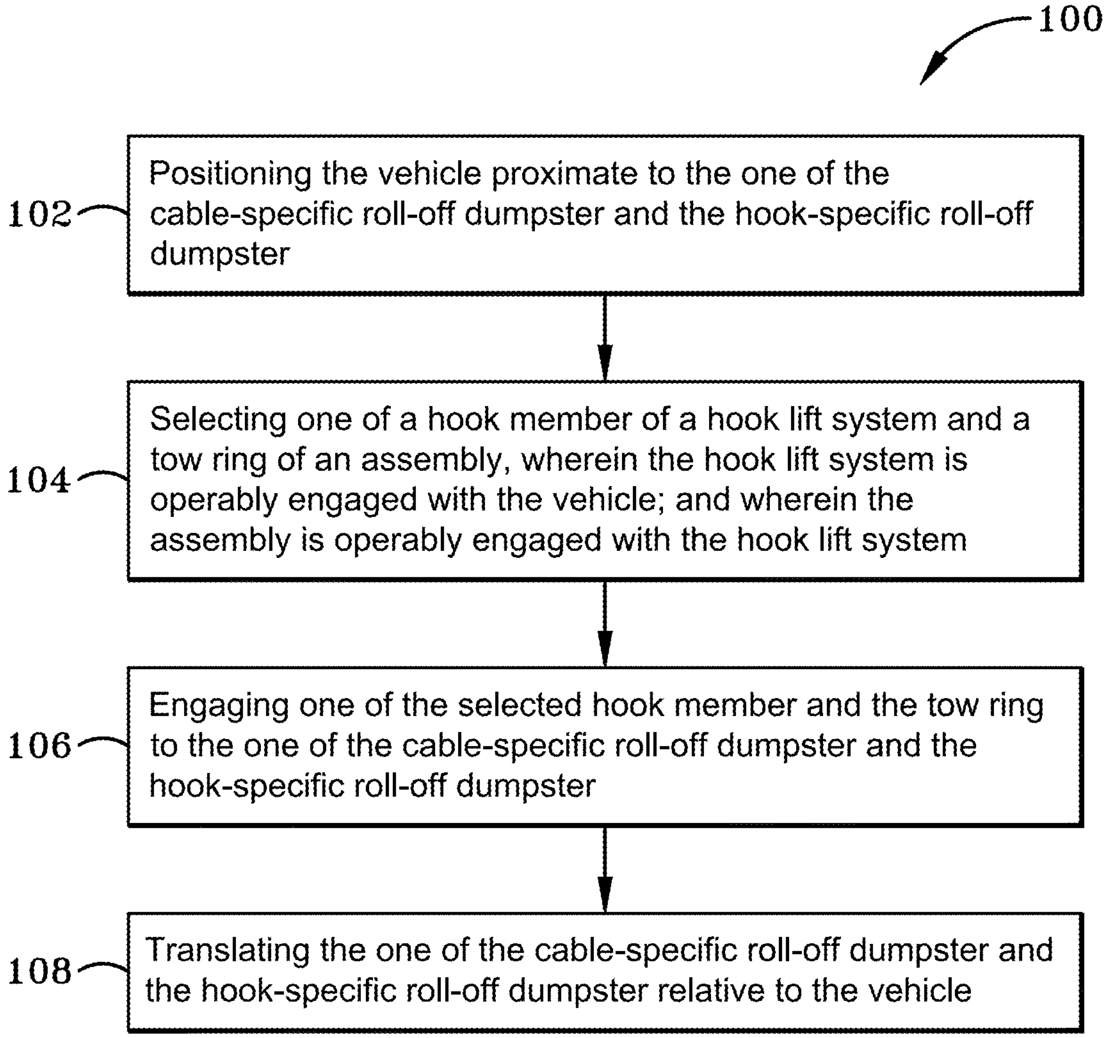
FIG. 16 is a method flowchart of translating one of a cable-specific roll-off dumpster and a hook-specific roll-off dumpster relative to a vehicle.

FIG. 16 illustrates a method 100 of translating one of a cable-specific roll-off dumpster and a hook-specific roll-off dumpster relative to a vehicle. An initial step 102 of method 100 comprises positioning the vehicle proximate to the one of the cable-specific roll-off dumpster and the hook-specific roll-off dumpster. Another step 104 of method 100 comprises selecting one of a hook member of a hook lift system and a tow ring of an assembly, wherein the hook lift system is operably engaged with the vehicle, and wherein the assembly is operably engaged with the hook lift system. Another step 106 of method 100 comprises engaging one of the selected hook member and the tow ring to the one of the cable-specific roll-off dumpster and the hook-specific roll-off dumpster. Another step 108 of method 100 comprises translating the one of the cable-specific roll-off dumpster and the hook-specific roll-off dumpster relative to the vehicle.

In other exemplary embodiments, method 100 may include additional and/or optional steps of translating one of a cable-specific roll-off dumpster and a hook-specific roll-off dumpster relative to a vehicle. Optional steps may include inputting a first input on the hook lift system, via a power mechanism, to move the hook lift system and the assembly proximate away from the vehicle and towards the one of the cable-specific roll-off dumpster and the hook-specific roll-off dumpster; and inputting a second input on the hook lift system, via the power mechanism, to move the hook lift system and the assembly towards the vehicle with the one of the cable-specific roll-off dumpster and the hook-specific roll-off dumpster. Optional steps may include that wherein the step of selecting one of the hook member of the hook lift system and the tow ring of the assembly further includes selecting the hook member of the hook lift system with the hook-specific roll-off dumpster; wherein the step of engaging one of the selected hook member and the tow ring to the one of the cable-specific roll-off dumpster and the hook-specific roll-off dumpster further includes engaging the hook member of the hook lift system with the hook-specific roll-off dumpster; and wherein the step of translating the one of the cable-specific roll-off dumpster and the hook-specific roll-off dumpster relative to the vehicle further includes translating the hook-specific roll-off dumpster. Optional steps may include that wherein the step of selecting one of the hook member of a hook lift system and the tow ring of the assembly further includes selecting the tow ring of the assembly with the cable-specific roll-off dumpster; wherein the step of engaging one of the selected hook member and the tow ring to the one of the cable-specific roll-off dumpster and the hook-specific roll-off dumpster further includes engaging the tow ring of the assembly with the cable-specific roll-off dumpster; and wherein the step of translating the one of the cable-specific roll-off dumpster and the hook-specific roll-off dumpster relative to the vehicle further includes translating the cable-specific roll-off dumpster. Optional steps may include removing a retaining member of the assembly from a frame of the assembly; rotating the frame and the tow ring of the assembly, via a retaining pin of the assembly, away from a control arm of the hook lift system; and providing the tow ring of the assembly from a retracted position to an extended position via the at least one latching mechanism of the assembly. An optional step may include engaging the retaining member of the assembly into the frame of the assembly when the cable-specific roll-off dumpster is provided on the vehicle. An optional step may include guiding a hook of the cable-specific roll-off dumpster into the tow ring via a first guide bar and a second guide bar provided on the tow ring. Optional steps may include removing the retaining member of the assembly from the frame of the assembly; translating the cable-specific roll-off dumpster from the vehicle to a ground surface via the assembly and the control arm; rotating the frame and the tow ring of the assembly, via a retaining pin of the assembly, away from the control arm of the hook lift system; disengaging the hook of the cable-specific roll-off dumpster from inside of the tow ring; and reengaging the retaining member of the assembly into the frame of the assembly when the cable-specific roll-off dumpster is provided on the vehicle. An optional step may include providing the tow ring of the assembly from the extended position to the retracted position via the at least one latching mechanism of the assembly.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms “upwardly”, “downwardly”, “vertical”, “horizontal”, “lateral”, “transverse”, “longitudinal”, and the like are used herein for the purpose of explanation only unless specifically indicated otherwise.

Although the terms “first” and “second” may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to “an embodiment,” “one embodiment,” “some embodiments,” “one particular embodiment,” “an exemplary embodiment,” or “other embodiments,” or the like, means that a particular feature, structure, or characteristic described in connection with the embodiments is included in at least some embodiments, but not necessarily all embodiments, of the invention. The various appearances “an embodiment,” “one embodiment,” “some embodiments,” “one particular embodiment,” “an exemplary embodiment,” or “other embodiments,” or the like, are not necessarily all referring to the same embodiments.

If this specification states a component, feature, structure, or characteristic “may”, “might”, or “could” be included, that particular component, feature, structure, or characteristic is not required to be included. If the specification or claim refers to “a” or “an” element, that does not mean there is only one of the element. If the specification or claims refer to “an additional” element, that does not preclude there being more than one of the additional element.

As used herein in the specification and claims, including as used in the examples and unless otherwise expressly specified, all numbers may be read as if prefaced by the word “about” or “approximately,” even if the term does not expressly appear. The phrase “about” or “approximately” may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as “comprising,” “including,” “carrying,” “having,” “containing,” “involving,” “holding,” “composed of,” and the like are to be understood to be open-ended, i.e., to mean including but not limited to. Only the transitional phrases “consisting of” and “consisting essentially of” shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A method of translating a cable-specific roll-off dumpster relative to a vehicle, comprising steps of:

rotatably engaging a frame of an assembly with a control arm of a hook lift system at a first position;

selectively engaging the frame of the assembly with the control arm of the hook lift system at a second position, by a retaining member of the assembly, between a locked position and an unlocked position;

rotatably engaging a tow ring with the frame;

positioning the vehicle proximate to the cable-specific roll-off dumpster;

selecting one of a hook member of the hook lift system and the tow ring of the assembly, wherein the hook lift system is operably engaged with the vehicle; and wherein the assembly is operably engaged with the hook lift system;

engaging one of the selected hook member and the tow ring to the cable-specific roll-off dumpster; and translating the cable-specific roll-off dumpster relative to the vehicle;

wherein when the frame is in the locked position, the frame is rotatably engaged with the control arm at the first position and engaged with the control arm by the retaining member at the second position simultaneously; and wherein when the frame is in the unlocked position, the frame is rotatably engaged with the control arm at the first position only and is free from engaging with the control arm and the retaining member at the second position.

2. The method of claim 1, further comprising:

inputting a first input on the hook lift system, via a power mechanism, to move the hook lift system and the assembly away from the vehicle and towards the cable-specific roll-off dumpster; and inputting a second input on the hook lift system, via the power mechanism, to move the hook lift system and the assembly towards the vehicle with the cable-specific roll-off dumpster.

3. The method of claim 1, wherein the step of selecting one of the hook member of the hook lift system and the tow ring of the assembly further includes selecting the tow ring of the assembly with the cable-specific roll-off dumpster; and wherein the step of engaging one of the selected hook member and the tow ring to the cable-specific roll-off dumpster further includes engaging the tow ring of the assembly with the cable-specific roll-off dumpster.

4. The method of claim 1, further comprising:

removing the retaining member of the assembly from the frame of the assembly; and rotating the frame and the tow ring of the assembly away from the control arm of the hook lift system.

5. The method of claim 4, further comprising:

translating the cable-specific roll-off dumpster onto the vehicle; and engaging the retaining member of the assembly into the frame of the assembly when the cable-specific roll-off dumpster is provided on the vehicle.

6. The method of claim 5, further comprising:

removing the retaining member of the assembly from the frame of the assembly;

translating the cable-specific roll-off dumpster from the vehicle to a ground surface via the assembly and the control arm;

rotating the frame and the tow ring of the assembly away from the control arm of the hook lift system;

disengaging a hook of the cable-specific roll-off dumpster from inside of the tow ring; and reengaging the retaining member of the assembly into the frame of the assembly when the cable-specific roll-off dumpster is provided on the vehicle.

7. The method of claim 6, further comprising:

moving the tow ring of the assembly from an extended position to a retracted position via at least one latching mechanism of the assembly.

8. The method of claim 1, further comprising:

guiding a hook of the cable-specific roll-off dumpster into the tow ring via a first guide bar and a second guide bar provided on the tow ring.

9. The method of claim 1, wherein the step of engaging the frame of the assembly with the control arm of the hook lift system at the first position further comprises:

engaging at least one upright support of the frame to the control arm;

engaging at least one mounting plate with the at least one upright support at a first end of the at least one upright support; and rotatably engaging the at least one mounting plate with the control arm at the first position.

10. The method of claim 9, wherein the step of rotatably engaging the at least one mounting plate with the control arm at the first position further comprises:

engaging a securement pin with the at least one mounting plate and the control arm of the hook lift system;

wherein the frame is rotatable about a longitudinal axis of the securement pin.

11. The method of claim 1, further comprising:

engaging a latching mechanism with the frame and the tow ring; and positioning the tow ring in a retracted position or in a released position via the latching mechanism.

12. The method of claim 11, wherein the tow ring is in the retracted position when the latching mechanism is in an extended position; and wherein the tow ring is in the released position when the latching mechanism is in a stored position.

13. A method of translating a cable-specific roll-off dumpster relative to a vehicle, comprising steps of:

engaging a frame of an assembly with a control arm of a hook lift system at a first position;

selectively engaging the frame of the assembly with the control arm of the hook lift system at a second position, by a retaining member of the assembly, between a locked position and an unlocked position;

engaging at least one upright support of the frame to the control arm;

engaging at least one mounting plate with the at least one upright support at a first end of the at least one upright support;

rotatably engaging the at least one mounting plate with the control arm at the first position;

engaging at least one bracket with the at least one upright support at a second end of the at least one upright support opposite to the first end of the at least one upright support;

wherein the at least one bracket is moveably engaged with the control arm at the second position on the control arm;

positioning the vehicle proximate to the cable-specific roll-off dumpster;

selecting one of a hook member of the hook lift system and a tow ring of the assembly, wherein the hook lift system is operably engaged with the vehicle; and wherein the assembly is operably engaged with the hook lift system;

engaging one of the selected hook member and the tow ring to the cable-specific roll-off dumpster; and translating the cable-specific roll-off dumpster relative to the vehicle.

14. The method of claim 13, wherein the at least one bracket is in a locked position when the retaining member operably engages with the at least one bracket and the control arm.

15. The method of claim 13, wherein the at least one bracket is in an unlocked position when the retaining member operably disengages from the at least one bracket and the control arm.

16. A method of translating a cable-specific roll-off dumpster relative to a vehicle, comprising steps of:

positioning the vehicle proximate to the cable-specific roll-off dumpster;

selecting one of a hook member of a hook lift system and a tow ring of an assembly, wherein the hook lift system is operably engaged with the vehicle; and wherein the assembly is operably engaged with the hook lift system;

engaging a frame of the assembly with a control arm of the hook lift system at a first position;

selectively engaging the frame of the assembly with the control arm of the hook lift system at a second position, by a retaining member of the assembly, between a locked position and an unlocked position;

engaging one of the selected hook member and the tow ring to the cable-specific roll-off dumpster;

guiding a hook of the cable-specific roll-off dumpster into the tow ring via a first guide bar and a second guide bar provided on the tow ring; and translating the cable-specific roll-off dumpster relative to the vehicle;

wherein when the frame is in the locked position, the frame is rotatably engaged with the control arm at the first position and engaged with the control arm by the retaining member at the second position simultaneously; and wherein when the frame is in the unlocked position, the frame is rotatably engaged with the control arm at the first position only and is free from engaging with the control arm and the retaining member at the second position.

* * * * *